G. R. CORNWALL.
MACHINE FOR MAKING CONTROLLERS OR COMPOSING RIBBONS.
APPLICATION FILED AUG. 30, 1901. RENEWED SEPT. 12, 1914.
1,136,080.
Patented Apr. 20, 1915.
12 SHEETS—SHEET 7.
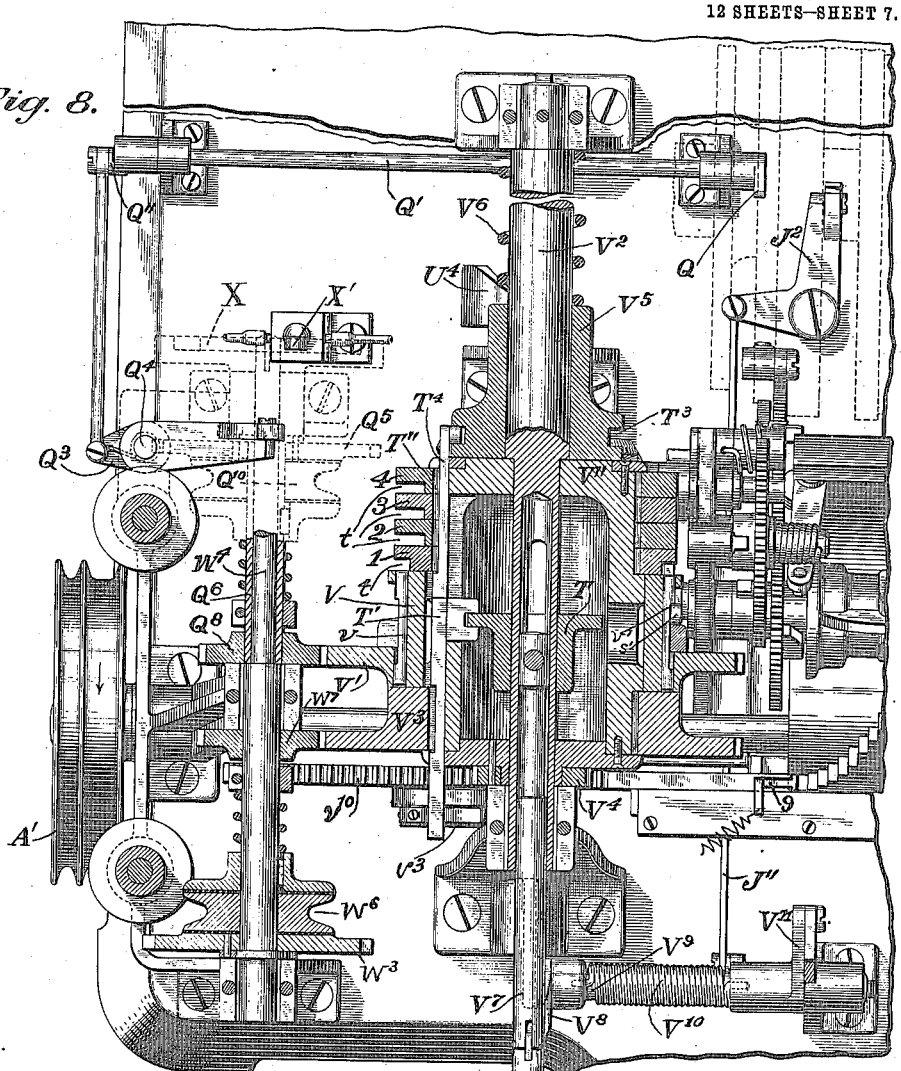
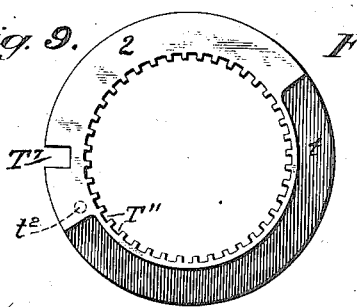
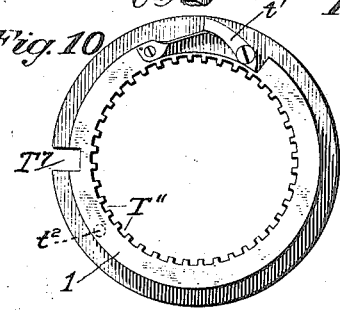
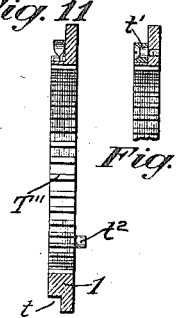
Witnesses:
Inventor:
George R. Cornwall

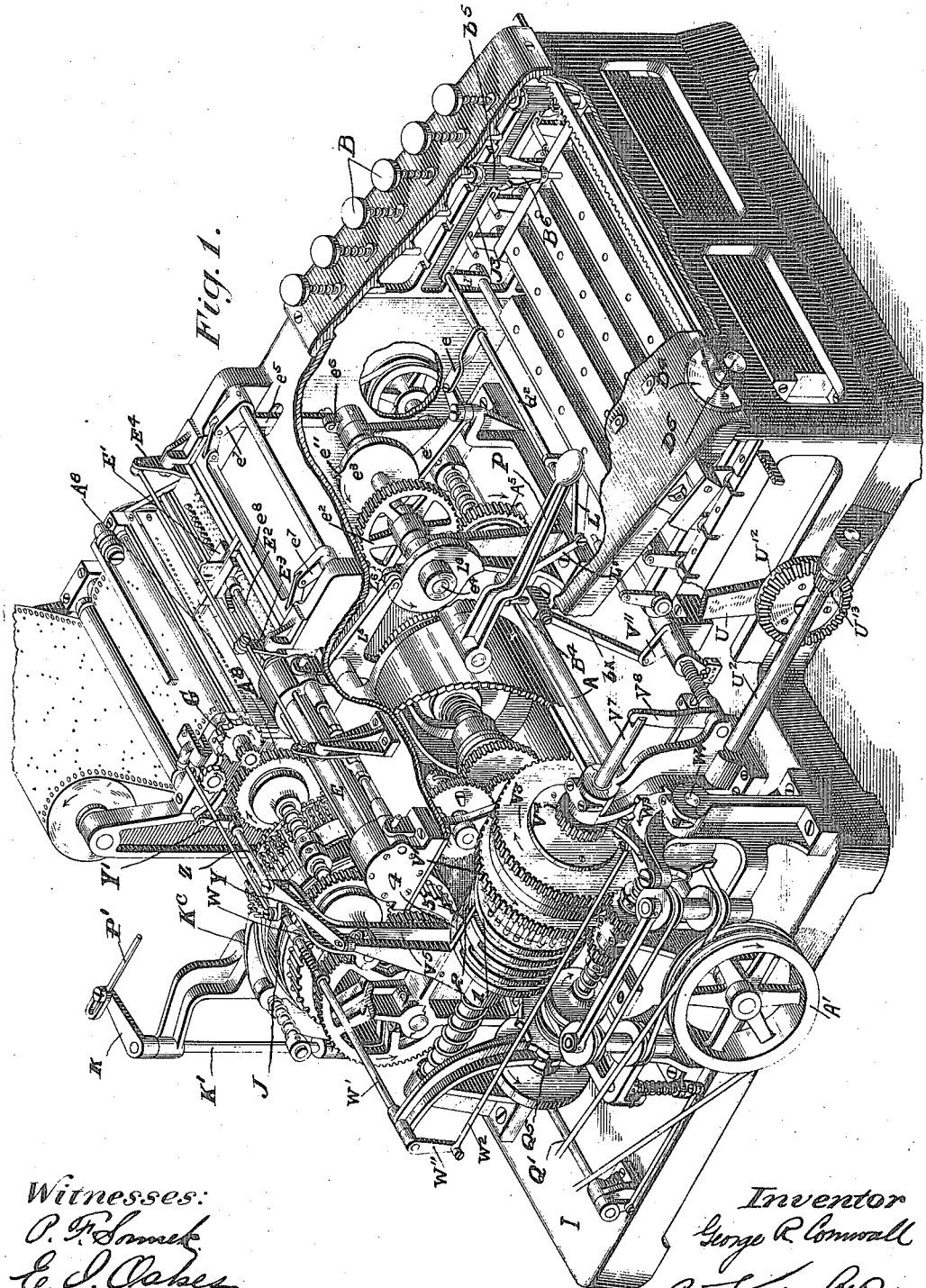

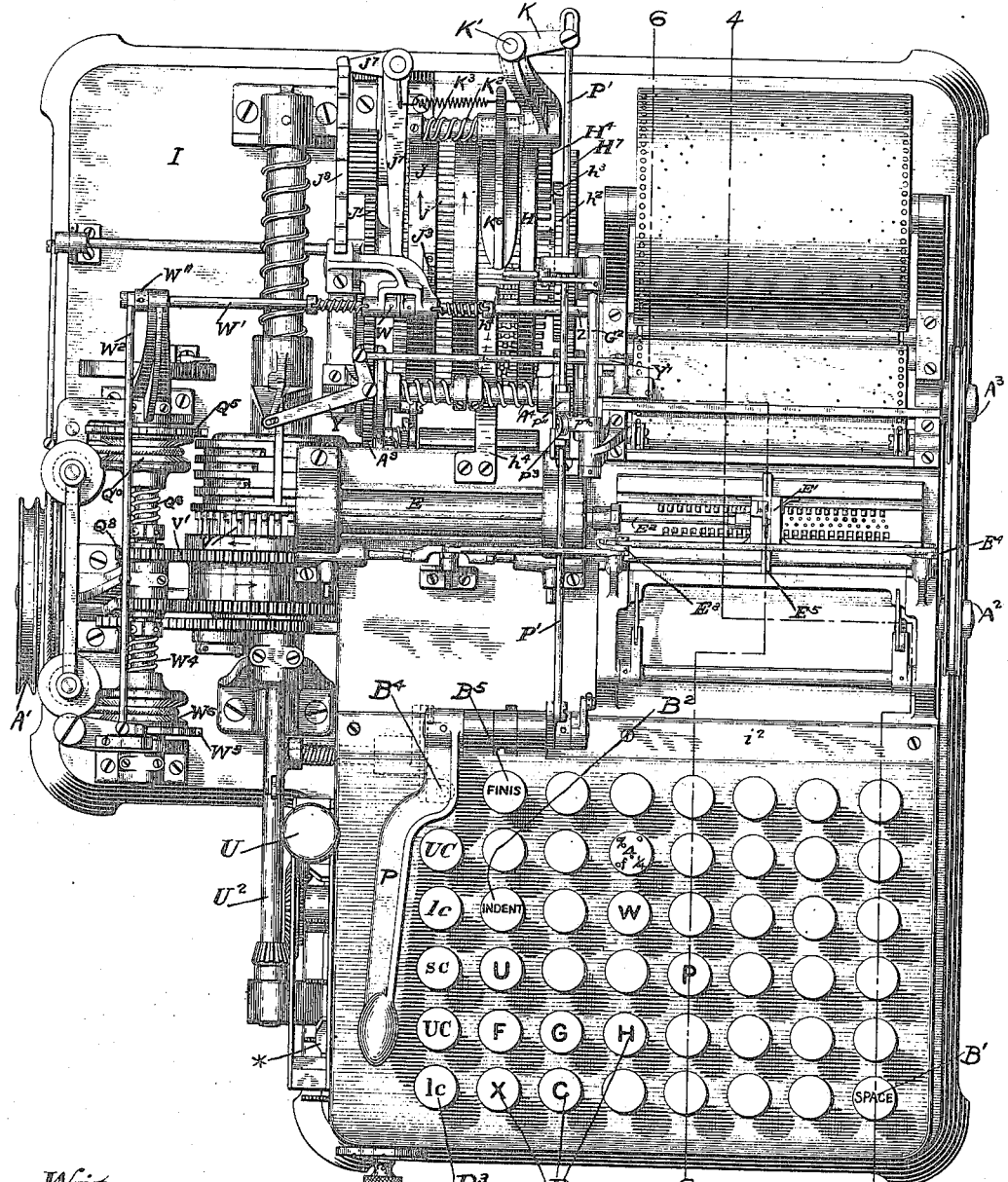

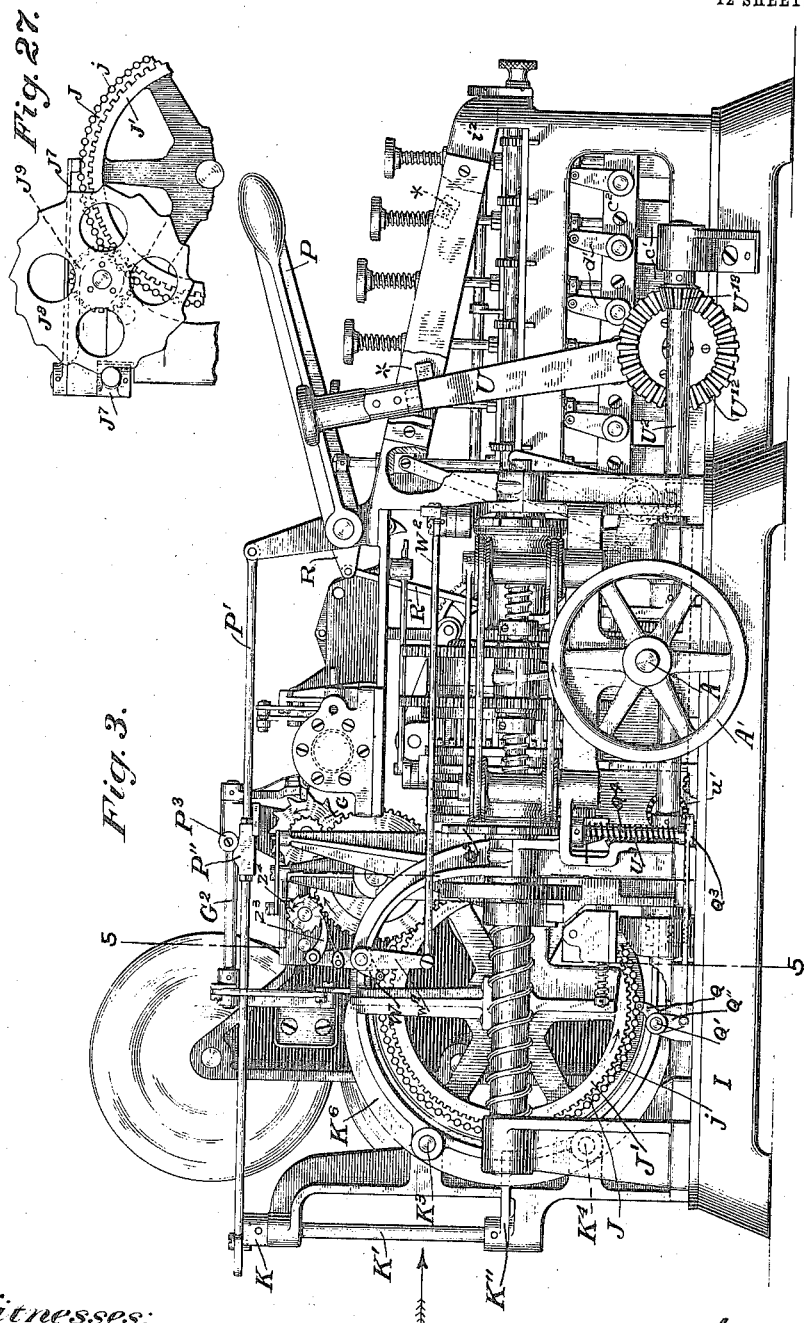

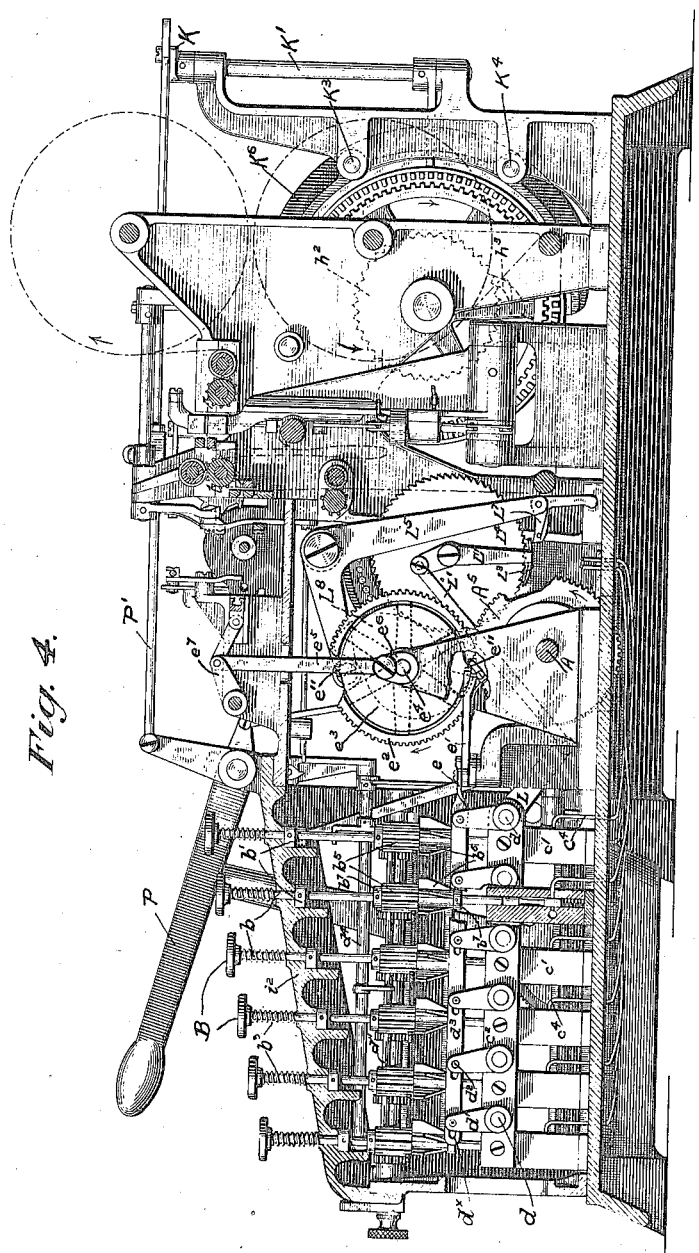

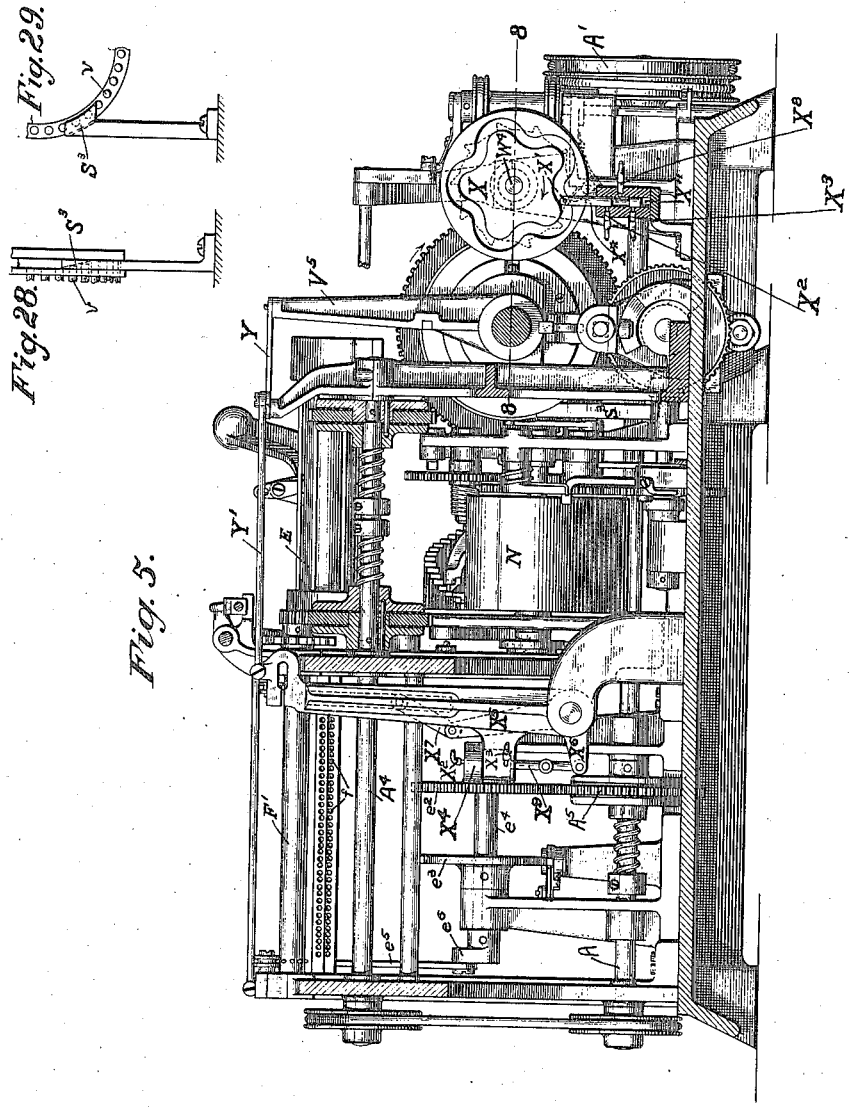

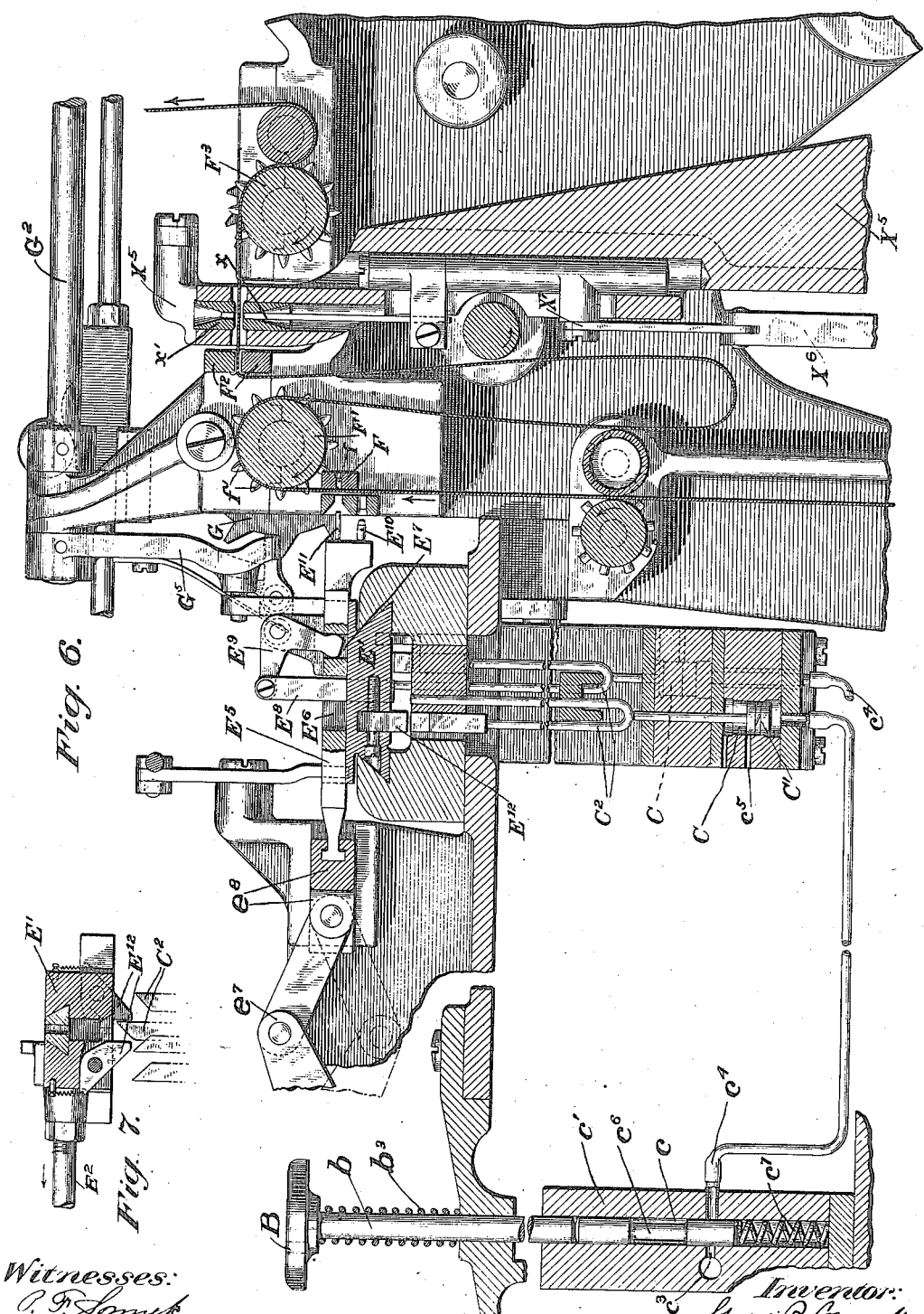

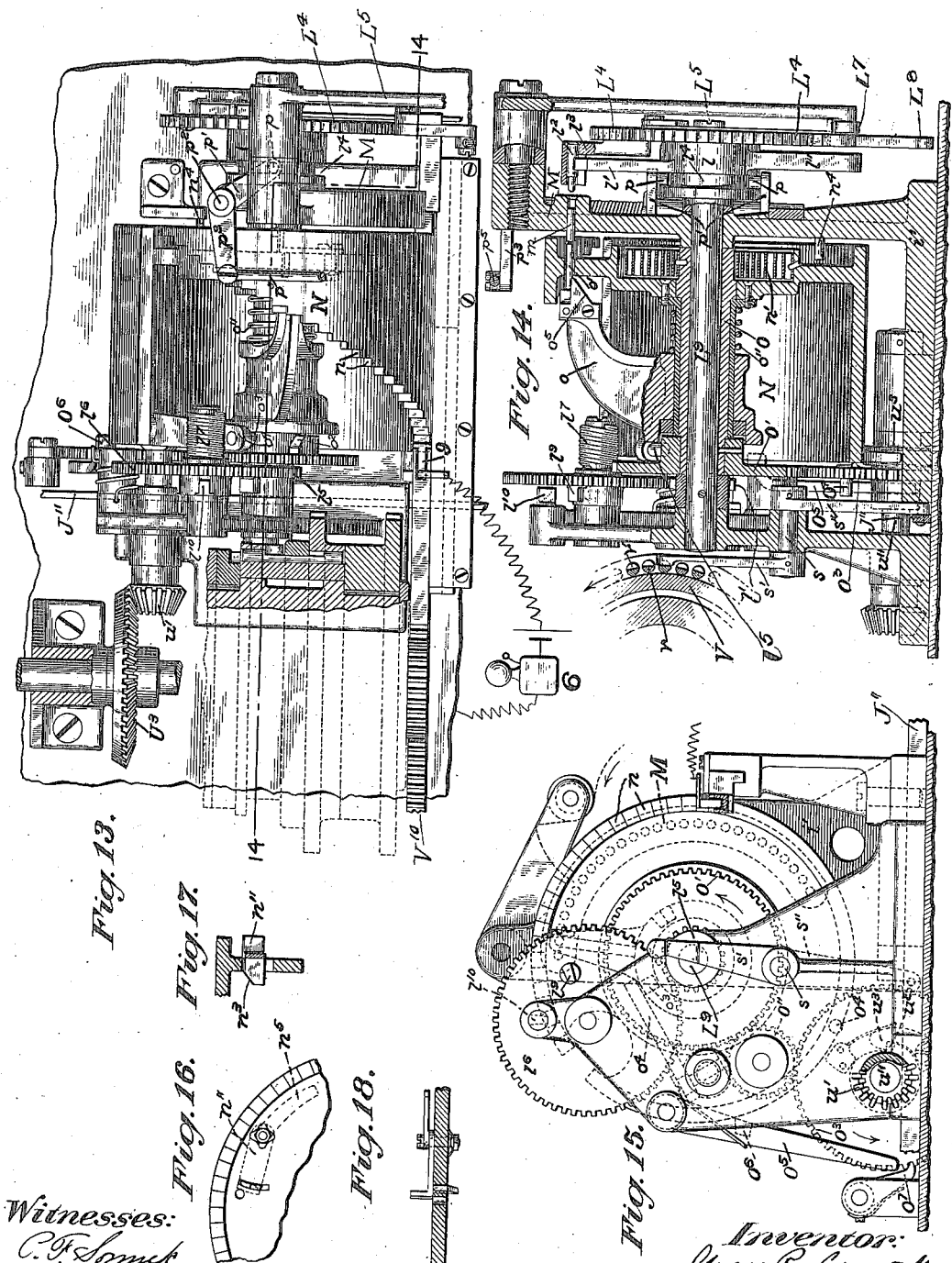

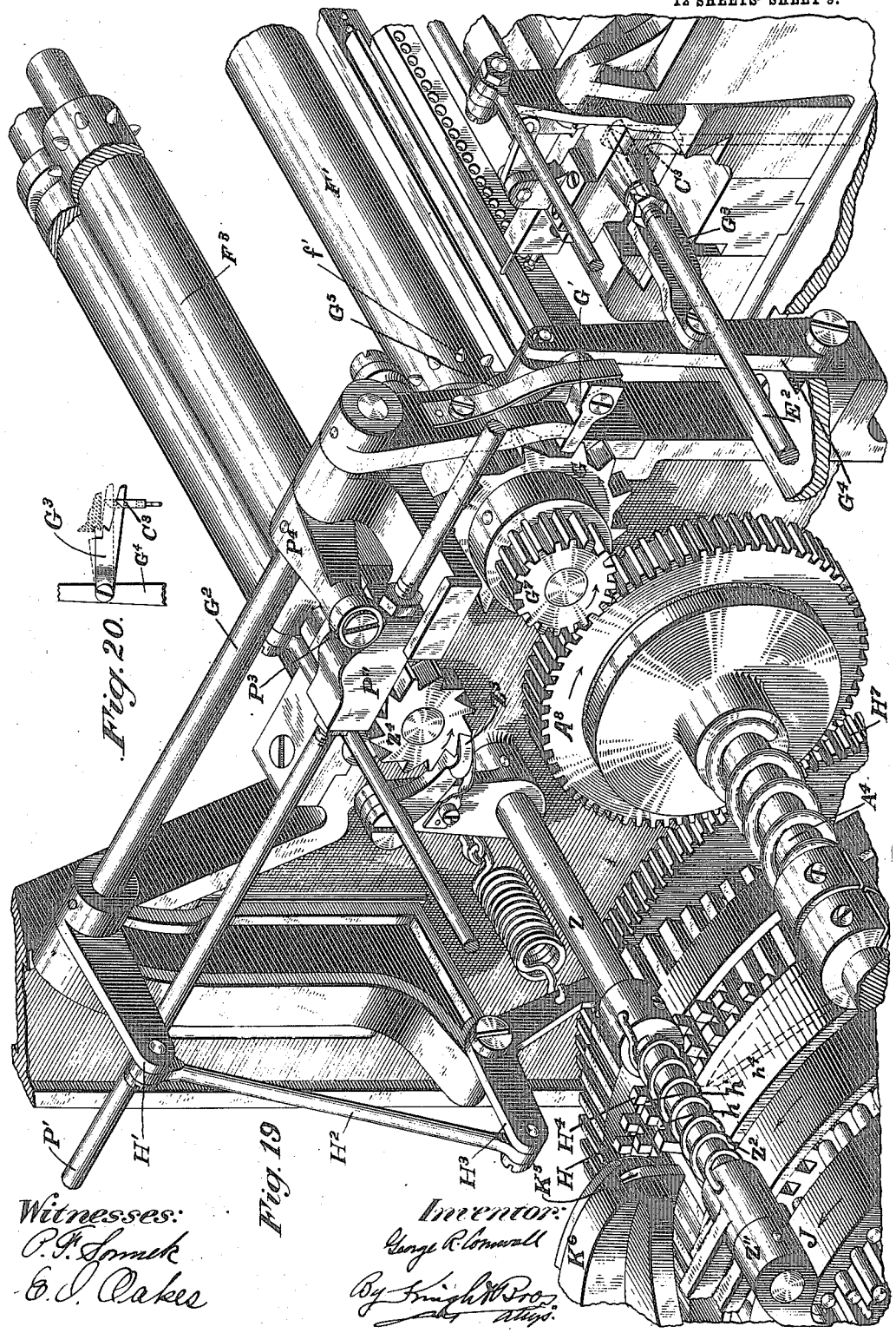

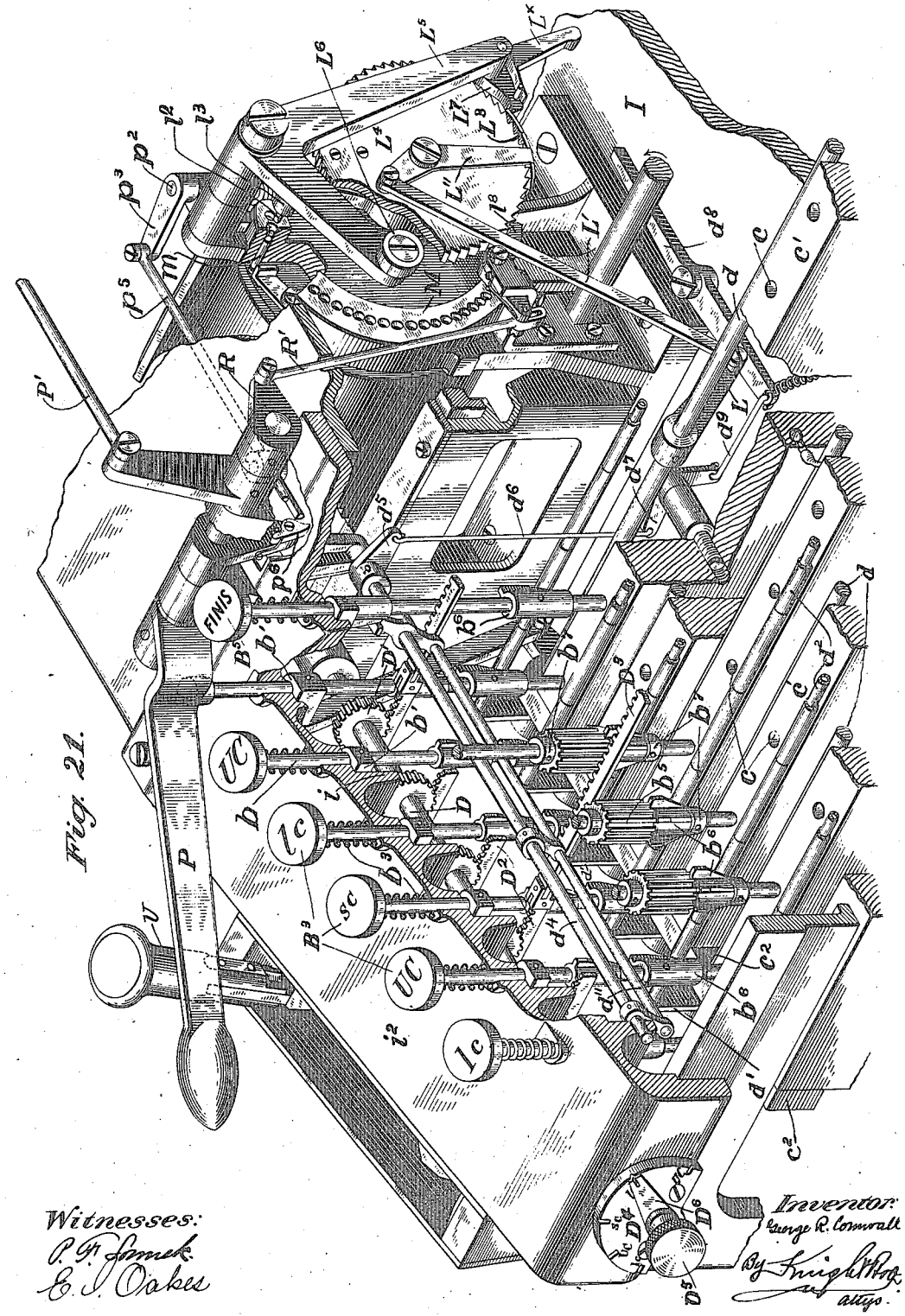

G. R. CORNWALL.
MACHINE FOR MAKING CONTROLLERS OR COMPOSING RIBBONS.
APPLICATION FILED AUG. 30, 1901. RENEWED SEPT. 12, 1914.
1,136,080.
Patented Apr. 20, 1915.
12 SHEETS—SHEET 11.
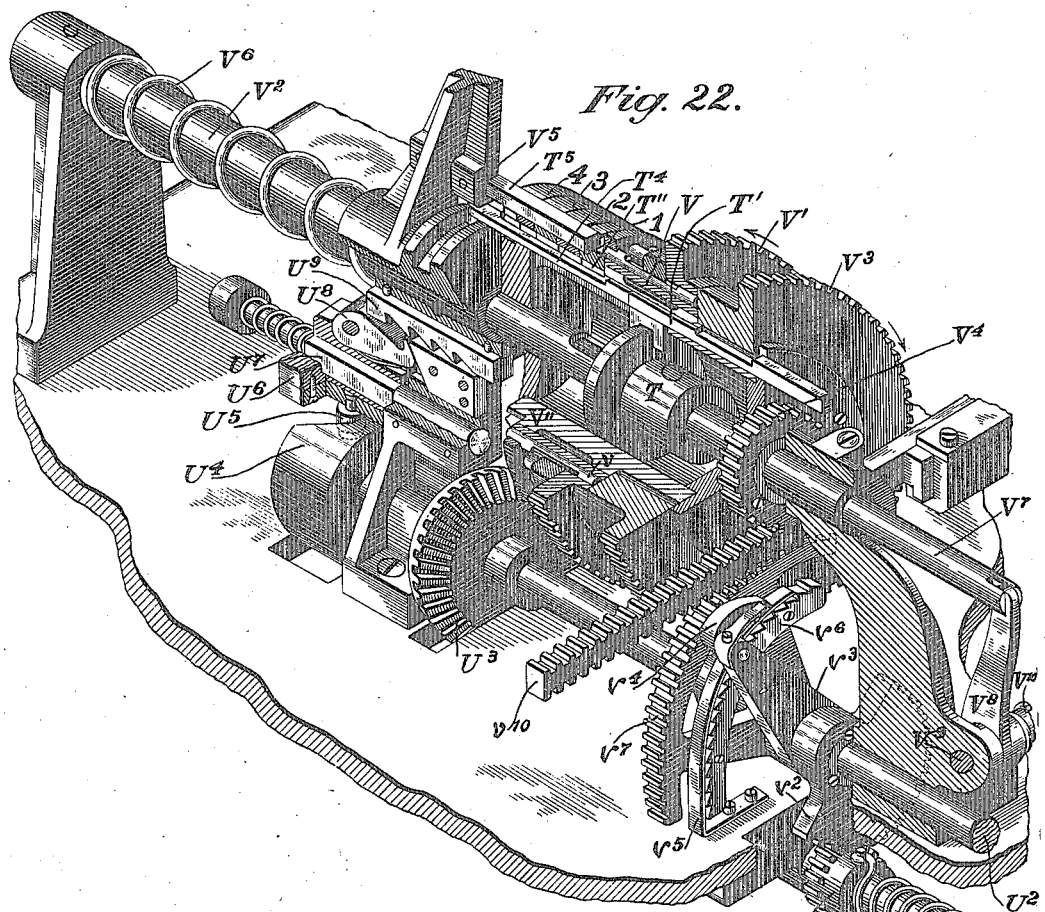
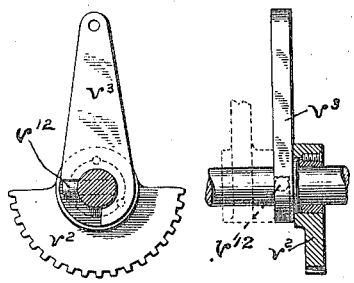
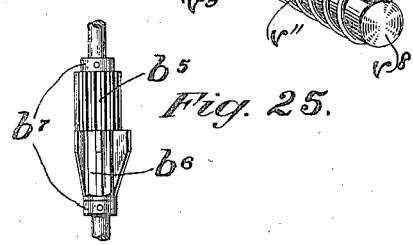
Witnesses:
Inventor:

G. R. CORNWALL.
MACHINE FOR MAKING CONTROLLERS OR COMPOSING RIBBONS.
APPLICATION FILED AUG. 30, 1901. RENEWED SEPT. 12, 1914.

1,136,080.

Patented Apr. 20, 1915.
12 SHEETS—SHEET 12.

Fig. 30.

Witnesses:
H. C. Workman
W<sup>m</sup> P. Hammond.

Inventor,
George R. Cornwall,
By Knight Bros
Attorney.

UNITED STATES PATENT OFFICE.

GEORGE R. CORNWALL, OF MOUNT VERNON, NEW YORK, ASSIGNOR, BY MESNE ASSIGNMENTS, TO JAMES G. COFFIN, TRUSTEE.

MACHINE FOR MAKING CONTROLLERS OR COMPOSING-RIBBONS.

1,136,080.     Specification of Letters Patent.     Patented Apr. 20, 1915.

Application filed August 30, 1901, Serial No. 73,824. Renewed September 12, 1914. Serial No. 861,470.

*To all whom it may concern:*

Be it known that I, GEORGE R. CORNWALL, a citizen of the United States, residing at Mount Vernon, in the county of Westchester and State of New York, have invented certain new and useful Improvements in Machines for Making Controllers or Composing-Ribbons, of which the following is a specification.

My invention relates to machines for making controllers for controlling the operation of an automatically operating typographic machine, and more particularly to an automatically operating printing machine which produces automatically printed matter in justified lines.

In certain of its features, further, my invention relates to machines for producing a controller for an automatically operating typographic or printing machine in which the characters are produced successively and in a particular sequence, a controller being produced which is adapted to produce a maximum amount of composition in the typographic machine for a given amount of mechanical operation thereof.

More particularly, a controller is produced by my invention which has a single indication, such as a perforation, for each character selected, and has a plurality of such perforations arranged on one transverse line of the controller, proper justification indications being also provided.

In certain of its features, the invention relates to a device producing a controller having a series of perforations representing letters or characters and word spaces, in justified relation, and other functional operations of a printing or other typographic type-setting or matrix making machine to be controlled by said ribbon being characterized as above.

A machine constructed in accordance with my invention enables the operator after perforating the composing ribbon to the extent of a line of unjustified matter to make the perforations necessary to justify the line, and to do so by a single manual operation, and without mental calculation, the mechanism being adapted to so arrange the perforations that they will select mechanism that will add to such normal spaces in a line as it is necessary to enlarge in order to justify, an amount equal to one or more units representing a common divisor of the justified line, but in no case to cause the word spaces to vary more than a single unit.

A machine constructed in accordance with, and embodying an exemplification of my invention, comprises a keyboard machine adapted to be manipulated by an operator who can finger the keys continuously, while the machine itself automatically produces the perforations representing the letters, characters and other functions of the machine, including justifying, and divides the sections they produce to represent lines of matter to be composed or printed, and requiring no observation or mental calculation on the part of the operator.

The invention as embodied comprises means for perforating a strip or ribbon along a transverse line, the perforations representing different letters or characters according to the position they occupy in the transverse line. The strip or ribbon so perforated forms a composing or selecting means for an automatic typographic apparatus in which the characters or types are arranged in a certain definite order, which may be alphabetical or in any other convenient order. In order to select the characters or types corresponding to the perforations in the strip each transverse line of perforations represents those characters which occur in the order or sequence in which the types or characters of the typographic apparatus are arranged.

The invention further comprises means for measuring the length of the line represented by the perforations in any given section of the ribbon representing a printed line, and also means for locating the perforations upon the composing ribbon, representing word spaces, so that they will co-operate with the word space mechanism of the printing machine in such manner as to produce a justified line.

The invention as embodied comprises also a punch carrier capable of a reciprocating movement in a guide, such movement being controlled by the successive projection and retraction of pins in the path of the carrier, through the medium of the keys, and said carrier having mounted therein a punch-locating pin and character punch whereby perforations are made representing the characters and word spaces; the construction and arrangement of mechanisms being such that the perforations representing a line of print being on a given section of ribbon sufficient in length to contain the same, and all perforations representing letters and characters occurring in sequence in the matter composed in the same order, whether consecutively or not, as they occur on the type carrier considered with reference to its direction of travel in presenting successive types at the place of impression are represented by perforations in a single transverse line of the controller strip or ribbon. This insures a minimum of movement or work of the mechanism of the typographic machine for a given amount of composition done.

The invention as embodied comprises, further, a keyboard having a series of character keys, each of which is capable of independent action and of being governed by a shift key, and connecting mechanism, to produce proper perforations for various characters, or combinations of characters, representing different units of feed or spacing along the line and taking care of these differences in the justification of the line.

The invention as embodied comprises also, a unit counting mechanism and a word space counting mechanism, which are adapted to automatically coöperate with a punch mechanism whereby the perforations representing word spaces will be so located upon the ribbon as to cause each line to be justified.

The invention comprises also, other features and mechanisms as set forth herein and an embodiment of which is shown in the drawings, together with certain details of construction and combinations of devices hereinafter set forth and more specifically pointed out in the claims.

Further objects and advantages of the invention will be set forth in part hereinafter and will in part be obvious herefrom to those skilled in the art.

The invention consists in the novel parts, constructions, arrangements, combinations and improvements herein shown and described.

The accompanying drawings referred to herein and forming a part hereof, illustrate one embodiment of the invention, and with the inscription herein exemplify an embodiment of the invention.

In the accompanying drawings, Figure 1 represents a perspective view of a machine embodying the essential features of my invention. Fig. 2, a top plan view thereof. Fig. 3, a side elevation taken on the left of the machine. Fig. 4, a vertical horizontal section taken on the line 4 4 of Fig. 2. Fig. 5, a transverse section, taken on the line 5, 5, of Fig. 3, looking in the direction of the arrow indicated thereon. Fig. 6, an enlarged vertical longitudinal section, with parts broken away, taken on the line 6, 6, of Fig. 2. Fig. 7, an enlarged detail sectional view of the punch carrier. Fig. 8, a horizontal sectional plan view of the justifier, taken on the line 8, 8, of Fig. 5. Figs. 9, 10, 11, and 12, detail views of the justifier rings. Fig. 13, a plan view of the unit counting mechanism. Fig. 14, a vertical section of the same, taken on the line 14, 14, of Fig. 13. Fig. 15, an end elevation of the unit pin sector, taken on the left side of the same. Figs. 16, 17 and 18, detail views of the unit step cylinder. Fig. 19, an enlarged perspective view of a portion of the punch carrier, feed for character and justified word space perforations, slide-cylinder, transfer beam, and counting-pin cylinder. Fig. 20, a detail view of the tape feeding mechanism. Fig. 21, an enlarged perspective view of the keyboard, with parts broken away to show more fully the construction of the respective keys and connecting mechanism. Fig. 22, a perspective sectional view of the justifier mechanism. Fig. 23, an end elevation of justifier rack-actuating arm. Fig. 24, a side sectional elevation of the same. Fig. 25, a side elevation of character key stem, and Fig. 26, an inverted plan view of the same. Fig. 27 is a detail side elevation of resetting mechanism for the pins in the pin drum. Figs. 28 and 29 are detail views of the word space pin resetting device. Fig. 30, is a diagram of a section of the strip perforated by this machine.

Suitable driving means which may be of any convenient and suitable form are provided and in the illustrated embodiment is power driven and furnished with a compressed air supply, the main power schaft, A, being arranged transversely through the center of the machine and provided upon one end with a master pulley, A', which communicates motion to the parts not operated by compressed air or by hand, the opposite end of said main driving shaft being provided with a pulley A², which imparts motion, through a suitable belt, to the pulley A³, on outer end of auxiliary shaft A⁴, which is provided upon its inner central part with frictional gearing connecting with the gears of the slide-cylinder and counting-pin cylinder, as will be hereinafter more fully referred to.

The machine illustrated and described by way of example as an embodiment of the invention being furnished with a constant supply of compressed air from a suitable source, is adapted in connection with air-valves to perform the following functions; first, to project a "stop pin" in the path of the punch carrier, upon the depression of a key; second, to operate the punch carrier, and third, to operate the punch to make justified word space perforations, which are not made at the time the perforations are made representing the letters and characters but are made subsequently so that they may be located on the ribbon in such manner as to cause the lines to justify.

The machine illustrated and described produces a controller for a printing or other machine organized to operate on the "unit measurement" system, and is shown with characters varying in width from two to seven units. For instance, the two-unit characters include such letters as "i" and the several punctuation marks, while at the other extreme is the seven-unit character "W". The normal word space may be assumed to be of three units.

Referring further by way of example to the accompanying drawings, the keyboard of the machine comprises, forty-eight keys, of which thirty-nine are character keys, B, each of which is shown as having five vanes, representing characters from two to seven units: one word space key, B', and one indent key, B², each representing three units; five shift-keys, B³, one line key, B⁴, and one finis key B⁵, each representing two units.

Each of the character keys of said keyboard, as also the indent or paragraphing key, is capable of performing three functions, viz.: First, to cause a "stop pin" to position the punch carrier to make a perforation at the proper place in the controller for the character represented by the key; second, to make a perforation, release the punch carrier, to operate the feed mechanism, and restore each "stop pin" to its normal position, and third, to cause the number of units corresponding to the particular character to to be counted—that is, to be recorded by suitable mechanism as a part of the line being composed later to be utilized in justifying the line. The word space key in addition to the above named functions, causes the punch carrier, through certain mechanism hereinafter fully described, to project a slide in a cylinder to what may be termed a "long setting", while all the other keys perform the functions first above mentioned, with the exception that the units represented thereby are not counted, and also cause the punch carrier, on its passing "space", to project a slide in said cylinder to what may be termed a "short setting", in the manner and for the purposes hereinafter mentioned.

The line key performs the same functions as the character keys, but does not count units, and is operated by the line lever which rests thereon and which will hereinafter be fully described.

Referring to the particular form of keyboard and keys shown by way of example (Figs. 4 and 7), the stem b of each of the keys is provided with a collar b', one side of which is flat and rests against a rib, i, of the plate i², forming a part of the housing or frame I of the machine. The collars, b', are rigidly attached to the key stems b and determine the normal position of the keys, which are held to such position by the springs, b³; the flat face of said collars resting against the ribs i, preventing the keys from changing their position by rotating in their bearings. The respective keys are provided with means adapted to coöperate with the unit counting or recording and storing mechanism, or connections therefrom and to call into action the perforating mechanism. In the embodied form of such means, upon the stem of each character key is loosely mounted a pinion b⁵, and vane or vanes b⁶, which are rigidly connected together but are rotatable together relatively to the key stem, and their rotative position around the key stem is controlled and changed by mechanism later to be described. The purpose of the pinion is to rotate the vanes about the key stem. The said vane or vanes and pinion are held to position longitudinally on the key stems by collars b⁷, rigidly attached to the key stems. The several vanes of a character key are arranged radially about the key stem, and extend outwardly a distance proportionate to the unit value of the corresponding character. Thus if one character represented by the key is of two units value or width in the line, and another of the characters represented thereby is of four units value, the vane for the latter will project radially proportionately farther, so as to give a correspondingly greater movement to the unit mechanism through the connections therebetween. The outer edges of these vanes are shown obliquely formed to effect a camming and consequent movement of the connections to the unit mechanism. (See especially Figs. 4, 21, 25 and 26.)

The word space key has but one vane, representing three units, while the indent key has two vanes, arranged one above the other on its key stem, the lower vane representing three units. The shift-keys, the line key, and the finis key have also two vanes, located one above the other on their respective key stems, the lower vanes representing two units. All the above named keys have no pinions, the movement they impart being uniform, the upper vane on each, with the exception of the word space key, being adapted to contact with a rock-shaft, and by intervening mechanism between it and the unit counting wheel, to prevent the counting of the units represented by such keys upon said wheel, while the lower vane upon the stems of each of said keys contacts with a transverse rod d², and connecting mechanism between it and the punch carrier, to cause the proper perforations to be made in the ribbon.

Connections are provided from the keys whereby the proper corresponding perforations are made in the controller by the perforating devices. In the embodied form of mechanism, as previously indicated, stops are actuated to position a traveling punch, and the particular form of connections employed comprise fluid pressure means for setting said stops for positioning the punch and punch carrier. As embodied and illustrated, the lower end of each of the key stems has its bearing in one of a series of vertical openings or chambers $c$, in the air-valve blocks $c'$, clearly shown in Fig. 6 and Fig. 21, there being six of such blocks extending transversely across the under side of the keyboard corresponding to the six rows of keys; each block having eight vertical openings to accommodate the stems of the forty-eight keys upon said keyboard; said air-valve blocks $c'$ being connected by cross bars $c^2$ at their ends.

Each of the vertical openings or chambers $c$, is provided with an air-supply opening $c^3$, communicating therewith on one side thereof, and an exit opening communicates with the exterior of the block on the opposite side (see Fig. 6) where it connects with a conduit or tube $c^4$ which tube also communicates with a cylinder C, beneath the piston $C'$. A vent $c^5$ is provided at or or about the center of each air-cylinder C.

The vertical openings $c$, in the air-valve blocks $c'$, are each provided with a valve $c^6$, pressed upwardly by a spring $c^7$, into contact with the end of the key stem, in which position the air or other fluid flow is cut off. On the depression of the key the cut out portion of the valve registers with the passages $c^3$ and the air flows into the tube $c^4$ and into the cylinder C, as fully shown in Fig. 6. A piston $C'$ is located in each air cylinder C beneath the punch carrier guide; said piston carrying a U-shaped pin $C^2$, which I term a "stop-pin", one of the members whereof is shown as a square bar having its upper end beveled, while the opposite member is cylindrical, and both members being adapted to move in corresponding openings in the punch carrier guide. Said stop pins $C^2$ are preferably arranged in two parallel rows, in staggered relation, as shown in the drawings. The air-supply opening $c^3$ (Fig. 6) is intended to communicate with an air chamber or other suitable source source of supply, so that upon the depression of a key its stem will move the corresponding valve $c^6$ downward to bring its recessed portion in position to allow the free entrance of the compressed air, allowing air to enter through opening $c^3$ in said valve-block, thence passing through the tube $c^4$ to the corresponding cylinder C, forcing its piston $C'$ and coöperating "stop pin" $C^2$ in position to arrest the punch carrier. As said piston reaches its limit the air pressure passes out through the vent $c^5$, leaving the stop pin free to be reset, the U-shaped stop pin having sufficient friction in its bearing to stay in position until finally reset. The spring $c^7$ resets the valve $c^6$ to its normal position. Upon depressing any other key, another "stop pin" is set in a similar manner, to operative position, and the stop pin represented by the key precedently struck is restored to normal position in a manner hereinafter described.

There are provided means for transferring from the keys to the unit storing means the value of the characters of the various keys operated and to call into operation the various mechanisms for transferring the key board designations to the controller. In the embodied form the vanes on the key stems previously described, are a part of such means, and coöperating therewith (see Figs. 1, 4 and 21) a series of rock shafts $d$, (Fig. 4) provided on each end with arms $d'$ whose upper free ends are connected by the rods $d^2$, thus forming a bail. Said rock-shafts are six in number to correspond with the six rows of keys in the keyboard, said rods $d$ and the bails $d^2$ being substantially parallel with its row of keys. One vane on each key stem is in position to rock the corresponding bail $d^2$ as the key is depressed. To transmit the movement of any baid $d^2$, when it is rocked by one of the keys in the corresponding row being depressed, without at the same time rocking the other bails $d^2$, at one side of the keyboard there is a bar $d^3$, pivotally connected with one of said arms $d^x$ and provided with slots, through which the rods $d^2$ extend, said bar $d^3$ connecting the series of arms $d'$. The connection of the front bail $d^2$ or arm $d'$ with the bar $d^3$ is pivotal but not slotted, so that every movement communicated to bar $d^3$ by any of the bails $d^2$ will correspondingly move the front bail $d^2$. Connected to said front shaft $d$ is an arm L and to said front bail $d^2$ is a pivoted link $e$ also pivotally connected to a bell crank lever $e'$ (as appears from Figs. 1, 4 and 21) which constitute part of the means for calling the various mechanisms of the machine into action and part of the unit storing mechanism as will be later described in detail. The properly positioned vanes $b^6$ upon the several key stems (which would be the right hand vanes as shown in Fig. 4) will upon the depression of such keys make contact with the rods $d^2$, coöperating with said keys, so that the rods $d^2$ will rock the arms a distance corresponding to the radial projection of said vanes. As the vanes upon each key stem are made to project radially distances corresponding to the width of the letter or character the key represents in the particular shift position, it is obvious that if a shift movement be made by which the same key will represent a letter of a different width, and means be provided to bring a different vane upon the same key stem into contact with the rod $d^2$, the arm $d'$ will be rocked, upon the depression of the key, by said vane a distance corresponding to the radial projection of the vane, which will represent the width of the character represented by said key after the shift movement takes place. The movements of the bar $d^3$ control the unit counting mechanism through arm L and link $e$ and connections, with a view to give the proper action of the justifying mechanism as hereinafter set forth.

The embodied form of mechanism for operating the vanes on the character key stems, when the type carriers are changed or shifted to bring a different style of character into operative position, is controlled by the respective shift-keys and may be described as follows: Beneath the keyboard, and on the left of the same, arranged in suitable bearings, is a shaft D, (Fig. 21) having pinions D' thereon which are adapted to engage with toothed bars $D^2$ upon the ends of slidable rack-bars $D^3$, arranged transversely under said keyboard so that the teeth of said rack bar $D^3$ mesh with the pinions $b^5$ on all the key stems in the particular row, as fully shown in Fig. 21, to give the vanes a rotary movement from one position to another, when the rack bar $D^3$ is slid longitudinally. For the purpose of so sliding the rack bars $D^3$ to change the respective vanes between the operative and inoperative positions, in the embodied form, upon the upper left side, and to the front of the keyboard is arranged a plate $D^4$ having notches upon the same, one notch for each respective shift-key, while upon the outer end of the shaft D is arranged a knurled hand piece $D^5$ carrying a finger $D^6$ which is adapted to engage with one of the notches on said plate $D^4$. This handle is to be set by the operator according to the shift key depressed, so that the shaft D will be rotated a distance corresponding to the movement required by the particular key depressed; each shift-key representing a type carrier having a different style of type.

As certain of the keys cause marks or perforations in the controller but have no place or value in the line being composed, such as the shift keys or the finis key means are provided whereby they call the perforating mechanism into action but are prevented from effecting the unit record of the line being composed. As embodied, longitudinally across the under part of the key-board, and adjacent to the stems of the shift keys, the line key and the finis key, is located a rock-shaft $d^4$ (see Figs. 4 and 21). Fixed to said rock shaft $d^4$ is a lever $d^5$ having a downwardly projecting rod $d^6$ pivoted thereto, the lower end of said rod being pivoted to one arm of a bell-crank lever $d^7$. Said bell crank lever $d^7$ is journaled in suitable bearings on the bed of the machine, the opposite arm of said bell-crank lever connecting with the lever $d^8$, through connecting rod $d^9$, as shown more fully in Fig. 21. When the shift-keys, the line key, and the finis key are depressed, the vanes upon the upper part of the stems of the same contact with a rod $d''$ carried by arms fixed on rock-shaft $d^4$, to throw the free end of said lever $d^8$ so as to rock said rock shaft and thus contact with the pawl of the unit wheel to prevent said pawl from counting the units of the key so depressed. The lower vanes upon said key stems rock the shafts $d$ as do the other keys, thus through link $e$ starting the machine, but the effect of the actuation of arm L is neutralized by the mechanism just described.

I will now describe the character perforating mechanism for making perforations in the controller, which may be a paper ribbon, representing the various letters and characters employed, as well as certain functional operations hereinafter described.

So far as concerns many features of the invention, the controller perforating means may be of any suitable or convenient form. In accordance with certain other features of the invention, however, a controller punching mechanism is provided, wherein a row of dies are provided corresponding to the full number of perforations to be made in the controller at that given point, and a punch traveling on the opposite side of the controller from the dies and adapted to be positioned in operative relation with any one of the dies to make the corresponding perforation in the controller. In the embodied form of such means, a punch carrier is provided reciprocating to and fro along the row of dies but on the opposite side of the controller and having in coöperative relation therewith means for actuating the punch to perforate the controller in coöperation with any particular die. The positioning means for arresting the carriage have already been described, and the punch actuating means hereafter to be described, are called into action through movement of link $e$ previously referred to.

The mechanism for making the perforations in the controller, in the embodied form, comprises an air-cylinder containing a piston, which is adapted to operate a carrier provided with a punch having two members, one for adjusting the punch while the carrier is being brought to rest and the other for making the perforations representing the characters; a series of "stop pins" in the carrier guide, capable of being operated by the keys to control the movement of said carrier, and a rock-shaft adapted to be operated by the movement of the carrier, and connecting mechanism, to control the feed of the ribbon, besides performing other functions, all of which will be described in their proper order.

The traveling punch carrier E' reciprocates in guides in the machine frame (see Figs. 1, 2, 6 and 19). In the present embodiment, the punch carrier is driven by compressed air, although so far as concerns certain features of the invention, any suitable and convenient form of drive may be used. As embodied, a piston $E^2$ is fixed to the punch carrier E' and the piston is in a cylinder E, provided with suitable intake and exhaust ports and reversing gear. Referring more in detail to the embodied form of said mechanism, the air-cylinder E, is located back of the keyboard and to the left of the same, and is connected with any constant source of supply for operating its piston, which is connected to the punch carrier E', by a piston rod $E^2$, to give it a reciprocating motion, which is controlled by the elevation and depression of the "stop pins" $C^2$, by means of the keys, to register the punch with the respective dies corresponding to the depressed keys. The punch carrier by making contact at the limits of its travel with levers $E^3$ and $E^4$, will alternately open and close the exhaust and supply ports of the cylinder E, thereby causing the piston to reciprocate and impart its movement to the punch carrier.

The punch carrier has a punch $E^5$ adjusted therein, and at right angles thereto; said punch being operated by the following described mechanism: At a suitable point upon the rod $d^2$, (Fig. 1,) connected to the arms $d'$, at the rear of the keyboard, is secured the link $e$, the opposite end of which is pivoted to the short arm of a bell-crank lever $e'$ (Figs. 1 and 4) while the free end of the long arm of said lever is provided with a projection having an escapement pivoted thereon to successively engage with the spurs $e^{11}$, two in number and located at diametrically opposite points on the escape-wheel $e^3$, secured to the transverse shaft $e^4$. Said shaft $e^4$ carries a gear $e^2$ adapted to mesh with the frictional gear $A^5$, on main power shaft A. The escape-wheel $e^3$ makes a half turn, at each depression of a key upon the keyboard, and draws down or raises the pitman $e^5$, which is pivoted at its lower end to a crank $e^6$ on the end of shaft $e^4$, while the upper end of said pitman $e^5$ is pivoted at the center of one of a pair of toggle-joints $e^7$, the front ends of said toggles being in turn pivoted to the pressure bar $e^8$, connected to the punch $E^5$ as fully shown in Figs. 1, 2, 4 and 6. The punch $E^5$ is adapted to move transversely in the T-shaped groove of the pressure bar $e^8$, which in turn is operated by the toggles $e^7$, and their connecting mechanism, by the depression of a key, (shown more clearly in Fig. 6.) Said punch is provided with central slots $E^6$, and $E^7$ for the reception of the lower ends of the "stop pin" restorer $E^8$, and its operating lever $E^9$. Upon its front end is arranged the punch-locating pin $E^{10}$, which works in flare mouth openings in the frame to register the controller perforating punch with its die, and the shearing pin $E^{11}$ respectively, the latter of which makes the perforations in the ribbon or strip.

The punch $E^5$ (Fig. 7) is adjusted in the carrier E' and is given a reciprocating movement therein, and at a right angle to the movement of the same, equal to the throw of the toggles previously described. The carrier E' reciprocates transversely in its guide, and alternately from the left to the right, the T-groove in the pressure bar $e^8$ extending the entire length of said bar and accommodating the punch to the reciprocating movement of the carrier E', which moves, as already stated, in a transverse direction. The bottom of the punch carrier E' is also provided with suitable slots, one on each side of the "stop pin" restorer $E^8$, and pivoted therein are spring-actuated pawls $E^{12}$, the lower ends of which are beveled in opposite directions and their flat sides adapted to contact with the flat sides of the respective "stop pins", as fully shown in Fig. 7. There are in the present embodiment forty-eight of these "stop pins" arranged in two parallel lines, twenty-four being located in slots in the back of the punch carrier guide, and an equal number on the front, one of said lines being staggered in relation to the other, and those on the back all having their bevel edges inclined in the same direction, or to the left, and their flat side presented to the flat side of its corresponding pawl $E^{12}$, on the punch carrier E'. Those on the front have their bevel edges all inclined in the reverse direction, or to the right, while the flat side of the same is adapted to contact with the flat side of its corresponding pawl, and in a reverse direction to that of the pins in the back row, as above mentioned (see Fig. 7).

The embodied form of mechanism for feeding the ribbon, after all the perforations have been made that can be placed upon one transverse line, may be described as follows: The ribbon is fed from a roll through the machine, in the direction of the arrows shown on Fig. 6, first passing through a die-block F, at which point it receives the various character perforations; this die-block or die-plate is provided with a series of holes $f$ representing a plurality of dies each adapted to coöperate with the punch shearing pin E''. The holes $f$ correspond to the respective keys of the keyboard, and the stops for the punch carriage arrest that carriage with the shearing punch in register with one of the die holes $f$. The controller strip is fed in exact position with reference to the die block holes $f$, so that the perforation for a particular character occurs at a fixed and definite point in the controller and is so recognized in the typographic machine. The controller strip then passes over the feed roller $F'$ which is provided at each end with sprockets, $f'$ (more clearly shown in Figs. 1, 4, 6 and 19) at either end thereof, which project through series of holes in the respective side edges of the controller strip, thus giving a positive feed to the controller. From said feed roller $F'$ the controller passes through tension bars $F^2$, and between the word space punch $x$ and its die $x'$, and is fed from thence by a feed roller $F^3$ to any suitable roll or receptacle.

Before passing through the tension bars $F^2$, and the word space punch and its die, the paper forms a variable loop, (clearly shown in Fig. 6), the object of which is to allow one or more sections of the perforated ribbon, representing printed lines, to intervene between the perforating mechanism for making the character perforations and the perforating mechanism for making justified word spaces, in such manner as to allow the punch for perforating said word spaces to operate upon a precedently perforated section of the ribbon representing the matter to be printed.

As previously indicated, a plurality of perforations are made in a single transverse line of the controller dependent upon the sequence of characters, and means are provided for feeding the controller at the proper times in conformity therewith. Referring to the illustrated mechanism, the feed of the ribbon, and the transverse line and word space counting mechanism, is controlled by the escape-wheel G, near the end of feed roller $F'$, (see Fig. 19). The said wheel is actuated by an escapement $G'$ operated by the punch carrier $E'$ and the rock-shaft $G^2$, and their connecting mechanism in the following manner: When the punch carrier contacts with the short step of the two step pawl $G^3$, as it approaches the end of its travel, pivoted to the vertical arm $G^4$, (clearly shown in Figs. 19 and 20), and said arm in its turn being pivoted at one end to the machine frame and at its other end pivotally attached to a lug or projection upon the lower end of an arm $G^5$ rigidly connected with one end of the rock-shaft $G^2$, and carrying the escapement $G'$, said rock-shaft is actuated, and through the escapement $G'$ allows the escape-wheel G to move around the distance of one tooth, thus causing the feed roller $F'$ to revolve the distance of one sprocket and feed the ribbon one transverse line. Movement is imparted to feed roller $F'$ and escape-wheel G, by the pinion $G^7$, on end of said roller, meshing with the frictional gear $A^8$, on auxiliary power shaft $A^4$, and said gear in its turn meshing with the gear $H^7$ connected to the slide-cylinder H, so as to rotate said cylinder one step at each escapement, which movement rotates said cylinder to bring into position a slide $H^4$, to be subsequently set by the bell-crank $H^3$, upon the next movement of the rock-shaft $G^2$. This escapement, as well as all the other similar devices hereinafter denoted by that term, is provided with a pivoted latch and a detent or other suitable means acing alternately to release the escape-wheel only one tooth at each to and fro movement. Simultaneous with this action the lever $H'$, on opposite end of the rock-shaft, through its connecting rod $H^2$, (Figs. 4 and 19,) actuates the bell-crank $H^3$ to move a slide $H^4$ transversely in the slide-cylinder H, to a "short setting," the notch $h$ in said slide being in position to engage the blade $K^5$, attached to the transfer beam $K^6$. When the word space key is depressed, however, it raises its corresponding "stop pin" in the punch carrier guide, and as said pin is provided with a projecting cross pin $C^3$, it contacts with the under surface of the free end of the step pawl $G^3$, and raises it to such position that on the return of the punch carrier to normal position, at the left, the carrier strikes the end of the long step on said pawl $G^3$, whereby the parts above referred to will be given an additional movement, equal to the additional movement of the step pawl, which will be imparted to the bell-crank $H^3$, and cause the same to project a slide in the cylinder H to a "long setting," allowing the blade $K^5$ in the transfer beam $K^6$ to engage with the notch $h'$ of said slide; the feed of the ribbon and other movements being as previously set forth. Thus there is provided an embodiment of means for designating a letter representation upon the depression of a key and means for making the letter representation previously designated. That is, a delayed action is obtained, the perforation in the tape being made not when the corresponding key is selected, but on the selection of the next subsequent key. An operator is immediately aware when a wrong key is struck and by the delayed action an opportunity is afforded for correcting all such errors before they are recorded in the controller. Thus a very large percentage of errors occurring in composition are immediately eliminated or corrected by the operation and so do not appear at all in the composed matter. As soon as any slide has been set to either a long or a short setting the slide cylinder H is turned one step by escapement mechanism G above referred to, to thread or engage the slide on the blade K⁵ of the transfer beam K⁶, said blade engaging in notches h or h', as the case may be.

The mechanism for feeding the composing ribbon for each transverse line of perforations, will be operated when a word space is indicated by a perforation, regardless of the number of character or other perforations made upon said line, whether the same be one or more. The mechanism for feeding said ribbon from one transverse line to another will however be operated upon each return of the punch carrier to the left, whether a perforation representing a word space has been made or not. For instance, if the characters forming the word "however" were to be represented by perforations and assuming that in the typographic apparatus the types are arranged in alphabetical order, three perforations representing "h" "o" "w" would occur upon one line, and the punch carrier would return to the left and a feed of the ribbon would take place and the machine would continue to operate and make perforations on a line parallel to that already made, representing the letters "e" "v" and the return of the carrier to the left would again cause the composing ribbon to be fed forward the space of another transverse line, when the machine would again operate to make perforations representing "e" "r", and a word space, upon still another parallel line and the return of the carrier to the left would again cause the composing ribbon to be fed forward the space of another transverse line.

When the punch carrier travels in one direction in the guide, either to the right or to the left, to contact with one or more successively set pins in the same row, to form the part of a word, such as "how" (as in "however") the perforations for the same takes place on a single transverse line of the ribbon, and consequently but one slide is set to a "short setting" in the cylinder, for feeding said ribbon a single transverse line, but with each depression of the word space key, however, a slide is set to a "long setting," which will represent a word space and a transverse feed of the ribbon. The object of this may be stated as follows: There will be as many letters indicated upon one transverse line of the ribbon as there are letters occurring in alphabetical order in a word, and to count the number of transverse lines it will take to represent all the letters in a word it is necessary upon the return of the punch carrier to a normal position at the left, to have mechanism that will feed the ribbon one line and at the same time have the word spaces, which occur only at the end of one of the transverse lines, indicated. For this purpose every return movement of the punch carrier causes a slide to be set in the slide-cylinder one notch, or to a "short setting", and the said cylinder to be rotated a distance corresponding to that between slides, and in this manner the number of transverse lines that it takes to represent a word are counted upon the slide cylinder, and whenever a word space key is struck, as before described, the slide that will be set upon the return of the punch carrier to a normal position will be set so as to enter the notch h', in said slide, or to a "long setting". The controller is also kept in step, that is, proper relation to the justifying mechanism. Such additional movement, as already stated, is not only to represent a transverse line but also to indicate a word space.

The slide-cylinder H is shown as containing eighty slides, each provided with two notches h, h' for the "long" and "short" setting; said cylinder and its driving gear H⁷ being loosely journaled upon a fixed transverse shaft at the rear of the machine, and being connected by a ratchet and pawl connection h², h³, (Fig. 2,) so as to revolve upon the shaft in the direction of the arrow shown in Fig. 19, while immediately adjacent to said slide-cylinder and also adapted to turn freely on said shaft, is the counting-pin cylinder J, and its driving gear J'; said cylinder containing an equal number of loosely mounted pins j as there are slides in the slide-cylinder H. The counting-pin cylinder J, also revolves in the direction of the arrow shown in Fig. 19, but is prevented from turning by an escapement J² (see Fig. 8), until the line lever operates to actuate the said escapement and allow said counting-pin cylinder to make a one-half revolution. The slide-cylinder H and the counting-pin cylinder J are actuated respectively through gears H⁷ and J' by the frictional gears A⁸ and A⁹ (Fig. 2) on the auxiliary power shaft A⁴, whenever the escapements, hereinbefore mentioned, are made for the movement of either cylinder. An arm h⁴, Fig. 19, extending from the frame of the machine carries an inclined rib or shoulder in proximity to the slides H⁴ so as to engage the slides and return same to normal position as the rotation of the cylinder H brings the slides around toward the starting point, that is, to the top of the cylinder.

When a sufficient number of slides in the slide-cylinder have been located to represent the transverse line and word spaces representing the line of print to be justified, the line lever P will be depressed (Figs. 2, 3 and 4), and will cause the slides already set in the slide-cylinder H to be projected in such manner as to give a corresponding projection to the pins in the pin cylinder J, through the following instrumentalities: Upon the shaft of the line lever P there is an arm to which is attached a rod P' (Fig.

2), which extends back (as shown in Figs. 2 and 4), and connects with an arm K on upper end of vertical shaft K', journaled in suitable bearings at the extreme rear of the machine, (as fully shown in Figs. 2, 3, and 4,) while near the lower end of said vertical shaft is provided an arm K'', the inner end of which rests against the side of the transfer beam $K^6$ to move it transversely over the slide-cylinder H, when said line lever is operated; said transfer beam having its bearings on two fixed shafts $K^3$ and $K^4$, and capable of being returned to its normal position, after each operation of the same, by means of a helical spring $K^2$ on one of said shafts upon which the transfer beam moves. The movement of the arm K will cause the transfer to be made in the following manner: On giving the transfer beam a side thrust, upon its shafts $K^3$ and $K^4$, through the medium of the line lever, in the manner already described, it will compress the spring $K^2$, and at the same time all the slides which are operated by the transfer beam will project pins in the counting-pin cylinder J. a corresponding distance, (as shown in Fig. 19), the transfer beam then being returned to normal position by means of the spring $K^2$, as described. The slide cylinder H and its driving gear $H^7$ being connected by a ratchet and pawl connection, as stated, the operator may, especially in starting new work, after each such movement of the transfer beam, turn the slide-cylinder H forward to carry all of the pins that have been set off of the blade $K^5$ of said beam. A slide in said slide-cylinder H is set to a "short setting", one before and one after the movement of the transfer beam $K^6$, by the depression of said line lever P, in order to give two transmission feeds on the ribbon for each line lever operation. For this purpose there is connected with one arm of the line lever P, a rod P', (clearly shown in Figs. 2 and 3). At or about the center of this rod is provided a cam P''. Upon this cam rests a roller $P^3$ upon the outer end of an arm $P^4$, as clearly illustrated in Fig. 19. This arm is regidly connected with the rock-shaft $G^2$, which controls the escapement $G^5$, and the opposite end of which is provided with a lever for actuating the bell-crank lever $H^3$, in the manner already described, and which, at each movement of the line lever, will set two slides $H^4$ in the cylinder H, one before and one after each rotation of said cylinder.

The pivoted end of the rod P', which is connected to arm K at rear of the machine, is slotted, as shown in Fig. 2, so as to allow of the free movement of said rod for a short distance before it moves the arm K. The object of this is, that the cam P'' on said rod may operate and set a slide, as just described, before the rod moves the arm K, as said slide must be set and the cylinder H rotated to allow the slide to connect with the blade $K^5$ in the transfer beam $K^6$, before said beam is operated to transfer the setting of the slides, already in position, to the counting-pin cylinder J.

The line lever P, through depression of line key $B^4$ (Figs. 1 and 2), and downward movement of pitman $b^x$ and rocking of bell crank $V^{11}$, moves longitudinally the connecting rod J'', and operates the escapement $J^2$, (shown in Fig. 8) which engages a tooth $J^3$ on the periphery of the cylinder J, one of which is shown in Fig. 2, at the top, the other tooth being placed diametrically on the opposite side of the cylinder. It will thus be seen that upon the return of the line lever and key stem to normal position, the rod P' will restore the transfer beam $K^6$ to its normal position and complete the escapement so as to allow the pin cylinder to make a one-half rotation, carrying all the pins that have been previously set, out of the line of operation of the transfer beam and will bring into the said line another series of unset or reset pins to begin the setting of a new line. A reset lever $J^7$ (Figs. 2 and 27) pivoted to the frame engages a cam wheel $J^8$ connected by its pinion $J^9$ with the driving gear J' of the pin cylinder, the other end of said lever engaging the pins $j$, so that in the rotation of the pin cylinder, as each pin comes opposite the end of lever $J^7$ it is struck by said lever to push it into normal position. While making the half turn referred to, each of the pins set to a "long setting" will operate a finger Q, (see Figs. 3 and 8), this finger being carried upon a shaft Q' provided at one end with an arm Q'', (see Fig. 8), that connects by a rod with a lever $Q^3$ on a rock-shaft $Q^4$, (as shown in Figs. 1 and 8), said lever carrying an escapement $Q^x$ similar to one just described for the pin cylinder. This escapement allows the escape-wheel $Q^5$, (see Figs. 1, 3 and 8) to move the space of one tooth, in order that every pin set to a "long setting" in pin cylinder J, will indicate a word space on the word space pin drum V, and thereby count the word spaces by moving a pin set at the starting point at a distance therefrom corresponding to the number of teeth the escape-wheel $Q^5$ has been permitted to pass the escapement. The escape-wheel $Q^5$ is fixed to a sleeve $Q^6$, located on the shaft $W^4$, (as shown in Fig. 8), the opposite end of the sleeve being rigidly attached to a pinion $Q^8$ meshing with the gear V' of the word space pin drum V. This drum contains forty pins, $v$, one of which is always set at "zero," or the starting point, by the operation of the line lever, and is moved one step at a time while the word space escapement is operating. The escape-wheel $Q^5$ has power applied to it by means of a friction pulley $Q^{10}$, (shown in dotted lines in Fig. 8), to which it is attached, and said pulley connecting, by a belt and intermediate pulleys, with the masterpulley A', as clearly shown in Figs. 1 and 3.

I will now refer back to the keyboard and its connection with the unit counting mechanism, which comprises essentially, a unit counting wheel, a cam lever coöperating therewith, a unit-pin sector, a unit-step cylinder, and its setting mechanism, all of which will be described in their proper order.

It will be observed that upon depressing a key upon the keyboard, it causes the number of units to be counted that the character designated by such key represents, in the following manner: The depression of each key causes a reciprocating movement of the slotted bar $d^3$ (Fig. 4) upon the right of, and beneath, the keyboard, which in turn operates the lever L fast on one of the rockshafts $d$ and connected to the rod L', Figs. 4 and 21, the opposite end of which is pivoted to the shield lever L'', and allows the shield $L^3$, on the lower end of the same, to expose as many teeth on the unit-counting wheel $L^4$ as there may be units represented by the particular key depressed, and simultaneously with this action the bell-crank lever $e'$, Figs. 1 and 4, heretofore described, operates an escapement to allow the shaft $e^4$ to make a one-half turn, and with it the cam $L^8$ connected thereto, to operate the bell-crank pawl lever $L^5$, through its roller $L^6$, which rests upon said cam, (see Figs. 1 and 21) to allow the pawl $L^7$, on the lower arm of said spring-pressed pawl lever, to contact with the number of teeth that have been uncovered on said wheel $L^4$, and thereby cause the number of units, represented by the key depressed, to be counted thereon. This pawl $L^7$ is provided with a tail $L^x$ engaged by the lever $d^8$ to prevent the pawl from engaging wheel $L^4$ on the operation of certain of the keys as above described.

The unit-counting wheel $L^4$, is secured to one end of a shaft $L^9$, Figs. 14 and 15, running transversely through the frame $i'$, and is actuated by the respective keys on the keyboard in the manner already described. This wheel is shown in the form of a ratchet, and has as embodied sixty-four teeth, each representing one unit, and requiring three turns of the same to count one hundred and ninety-two units, representing the length of a single standard line. Upon the inner side of said wheel $L^4$, Figs. 13, 14 and 15, and sliding freely upon its hub, is provided a grooved sleeve $l$ having arms $l'$ and $l''$, radiating therefrom in opposite directions, the arm $l'$ engaging in a bracket $l^3$, rigidly attached to the wheel $L^4$, and said bracket carrying a pin $l^2$, in such manner that the arms $l'$ and $l''$ and the pin $l^2$ will turn freely with said wheel. The arm $l''$ acts simply as a counterpoise. The pin $l^2$, having a notch therein to engage with the arm $l'$, is adapted to be actuated by a mechanism described in the next succeeding paragraph, to set a pin $m$ in the unit-pin sector M (see also Fig. 21) to indicate the number of units lacking to complete a standard, or justified line, as will be hereinafter more fully described.

The sleeve $l$ upon the wheel $L^4$, above referred to, has an annular groove $l^4$, in which rest pins $p$ secured in the free ends of the arms $p'$ which are integrally connected to form a yoke rigidly attached to vertical shaft $p^2$, to the upper end of which is secured an arm $p^3$ (see Figs. 13 and 21), to which is pivoted the one end of a rod $p^5$, which is operated upon the depression of the line lever P, through the instrumentality of a latch $p^6$, contacting with the end of the rod $p^5$, thereby turning the shaft $p^2$ and causing the yoke to shift the sleeve $l$ by means of the pins $p$ in the groove $l^4$ and through the contact of the arm $l'$ with the pin $l^2$, to set a pin $m$ in the unit-pin sector M. There are twenty-six such pins arranged in the arc of a circle in the frame $i'$, forming the pin sector M, so that the unit wheel $L^4$ by being moved to any of twenty-six positions in the manner described may set any of said pins, which will determine the number of units that the step cylinder N hereinafter referred to may be moved.

To the shaft $L^9$ is secured a pinion $l^5$, which meshes with a gear $l^6$ upon the bearing of which is secured a spring $l^7$ (Fig. 13). It will be seen that as the wheel $L^4$ counts off the number of units to complete the justification of the line, this shaft $L^9$ which is rigidly connected with said wheel, will actuate the pinion $l^5$, which is also rigidly connected with said shaft, to rotate the gear $l^6$, thereby winding the spring $l^7$. This spring has a tendency to turn the shaft $L^9$ and wheel $L^4$, in the opposite direction from that in which they move while counting off the units, and the wheel $L^4$ is held from such rotation by means of a pawl $l^8$ (Fig. 21) which is thrown out of engagement with said wheel, upon the depression of the line lever P, by means of the crank R and the connecting rod R' (Fig. 21), as clearly shown in Fig. 21, whereupon the wheel is returned to normal position, through the instrumentality of the gear wheel $l^6$ and spring $l^7$, the lug $l^9$ on a side of said wheel contacting with a lug $l^{10}$ on the frame $i'$, to arrest the unit wheel $L^4$ at normal position, said wheel being then ready to be operated to determine the justification of the next line. The function of the counting mechanism above described is to count or measure the total unit value of the characters and normal word spaces in each line and determine at what point the pin $m$ shall be set in the unit-pin sector M by the operation of the line lever to mark this value.

Upon the central part of transverse shaft $L^9$ is arranged a loose sleeve O (Figs. 13, 14 and 15), one end of which is provided with a gear $O'$, which meshes with an intermediate gear $O''$, said gear in its turn meshing with gear $O^3$, carrying the pin $O^4$, while the opposite end of said sleeve is attached to one end of a coiled spring $n'$ located within the unit step-cylinder N, the opposite end of said spring being secured to said cylinder for the purpose hereinafter mentioned.

The step-cylinder above referred to is provided with twenty-six steps $n$, each representing one unit, arranged helically around the side of a portion of its periphery, as fully shown in Fig. 13, and is mounted loosely upon the sleeve O, above referred to, the hub of said cylinder forming a sleeve upon which is journaled the pin-restoring arm $o$, which is adapted to move longitudinally upon said sleeve and to carry a pin-restorer $o'$ upon its upper end, a spring $o''$ upon said sleeve being interposed between the arm $o$ and the inner wall of the step-cylinder to return said arm to normal position, as fully shown in Fig. 14.

In the lower part of the frame $i'$, and to the left of the unit step-cylinder N, is journaled a short shaft $s$, to the outer end of which is secured an arm $s'$, the upper end of which is adapted to project in the path of the notches $v'$ (see also Fig. 8) in the word-space pins $v$ loosely mounted in the pin drum V, while upon the opposite end of said shaft $s$, is provided an arm $s''$, having a pin upon its lower end which is adapted to engage with a slot in the connecting rod, $J''$ connected to the line lever P, which rod also operates the escapement for counting-pin cylinder J, as previously described. The depression of the line lever P will cause the connecting rod, $J''$, to operate the arm $s''$, and actuate the arm $s'$ to project a pin upon the side of the word-space pin drum V, at "zero" or setting point in front of a pawl upon the first ring of the justifier, to stop the said ring in a position corresponding to the number of word spaces in the line. When the pin so set has performed this function and the word-space drum is further rotated in the subsequent operations, a fixed inclined cam $S^3$ in Figs. 28 and 29 engages with this pin to restore it to normal position.

I will next describe the functions of the line lever P and the justifying lever U, in connection with the justifying mechanism by which the perforations are made representing word spaces for the justification of the lines to be printed. The various functions of the line lever may be enumerated as follows: It operates the stem of the line key $B^4$, upon which it rests; sets a pin in unit-pin sector M and a pin in word-space pin drum V; sets two slides in slide-cylinder H to a "short setting," one before and one after each movement of the transfer beam; also releases escapement $l^8$ upon the unit-counting wheel, and upon the counting-pin cylinder, and brings into action the locking spline connecting the justifier ring drum with the inner grooves of the justifier rings.

The functions of the justifier lever may be stated as follows: It winds the spring of the step-cylinder, and then sets said cylinder to the proper step, and simultaneously therewith it withdraws justifier external spline from the slot in first justifier ring, through the medium of a pawl-block and its cam, then causing justifier rack to move forward to turn the said first justifier ring until it is stopped by a pin on word-space pin drum, and thereafter releasing the successive justifier rings, when necessary for proper justification of the line, and operating the arm of the word-space punch, all of which will hereinafter be described in their relation to the mechanism for making the justified word spaces.

The justifying mechanism comprises the word-space pin drum which is mounted upon the justifier ring drum, said latter drum being mounted upon the justifier shaft; also four justifier rings; also an external spline-carrier which is adapted to release one or more of the justifier rings as the occasion may require, and through intervening mechanism to swing the word-space punch frame, and its punch, to the proper position to make the necessary justified word space perforations, also a normal spline-carrier to engage one or more of the justifier rings, and also a cam to operate the said word space punch through the medium of air-valves and connecting mechanism.

As above stated, the word-space pin drum V (Figs. 1, 2, 4, 8 and 22) is mounted upon the justifier ring drum $V''$, and contains forty pins $v$, arranged around the same in corresponding openings in the end rims of the drum, and one rim of said drum being provided with a circumferential gear $V'$; the said justifier ring drum $V''$, and its gear $V^3$, being in turn mounted upon the justifier shaft $V^2$, and having a pinion $V^4$ attached to its end wall, as shown in Figs. 8 and 22. The rear enlarged portion of said shaft $V^2$ is stationary, or fixed in its bearings, and is adapted to receive the external spline-carrier $V^5$, which slides freely upon said shaft and against the compression spring $V^6$. The front end of said shaft is composed of a hollow tube within which is adapted to slide the normal spline-carrier push rod $V^7$, (Fig. 22) engaging at its outer end with the upright lever $V^8$ secured to the transverse shaft $V^9$; a suitable tension spring $V^{10}$ on said shaft, intervening between it and the bell-crank lever $V^{11}$ on the opposite end of said shaft, and which is adapted to be operated by the line lever P (Figs. 1 and 22), at the proper time to force the push rod $V^7$ inwardly. The inner end of said push rod is keyed to the normal spline carrier T, which is mounted upon the forward part of the shaft $V^2$ and slides freely thereon; the key or pin upon the hub of the same passing through a slot in said shaft and engaging with the inner end of the push rod $V^7$, as above mentioned. The circular rim of the normal spline carrier is adapted to loosely fit within the slot on the projecting end of the normal spline $T'$, and said spline is adapted to enter any one of the slots $T''$ upon the inner surface of the justifier rings, in the manner and for the purpose hereinafter described.

The lower part or hub of the justifier external spline-carrier $V^5$ is provided, on a portion of the same, with a groove $T^3$, in which the roller upon the outer end of the internal spline $T^4$ moves (Figs. 1, 2 and 3), and as the justifier lever U is operated to move the spline carrier $V^5$ back upon the shaft $V^2$, the external spline $T^5$ (Fig. 8) is withdrawn from the first justifier ring, and the free end of the internal spline $T^4$ enters one of the series of slots $T''$ upon the interior surface of said ring, and as the justifier lever is again operated to bring the successive rings into operation, the spline-carrier $V^5$ moves still farther, causing the external spline $T^5$ to successively withdraw from the slots in the rings, as also to draw the internal spline into the slots $T''$ on the inner surface of said rings. With each successive operation of the justifier lever, the line lever P is also operated, and causes the normal spline carrier T to move the normal spline $T'$ forward to engage with one of the slots $T''$ of such rings as have been put into operation by the justifier lever, the internal spline and the normal spline, thus locking such rings into engagement with the justifier ring drum. Such movement of the external and internal splines is effected by a cam $U^4$ (Fig. 22) on the end of the justifier lever shaft $U^2$, which is operated by a pinion $U^{13}$ (Fig. 3) therein engaged by a bevel wheel $U^{12}$ on the justifier lever U.

When the justifier lever shaft $U^2$ is rotated, the cam $U^4$ thereon causes the cam-roller $U^5$, (Fig. 22) journaled upon lower side of the pawl-block $U^6$, to move said pawl-block on its guide $U^7$; the ratchet-pawl $U^8$ on said pawl-block $U^6$ engaging with the rack $U^9$ on lower end of external spline-carrier $V^5$, the vertical arm of which moves the bell-crank lever Y (Figs. 2 and 5) which, through the intermediate connecting rod $Y'$, swings the word-space punch frame $x^5$, and its punch, to any one of five positions to make the justified word-space perforations in the ribbon indicated by the "4, 5, 6, 7 and 8 unit justified spacing," (Fig. 30).

The four justifier rings 1, 2, 3 and 4, (Figs. 8, 9 and 10) are loosely mounted upon the justifier ring drum $V''$ and are each provided on their outer surface with a slot or key-way $T^7$ for the reception therein of the external spline or key $T^5$, and with a series of slots or key-ways $T''$, forty in number, upon their interior surface for the reception in one of the series of the internal spline or key $T^4$ and normal spline or key $T'$. The first justifier ring (Fig. 10) of the series is provided upon its face with a circumferential groove $t$, and with a spring-actuated pawl $t'$ which is adapted to contact with a word-space pin previously projected from the word-space pin drum, as hereinbefore mentioned. The remaining justifier rings (Fig. 9) have also a circumferential groove $t$, extending one-half way around the same, and each ring being provided with a pin $t^2$, which projects in the path of the next succeeding ring, for the purpose hereinafter to be mentioned. As already stated, the justifier rings are loosely mounted upon the justifier ring drum, but when one or more of said rings are released from the external spline and engaged by the normal spline and the internal spline, they are thus splined to and move in unison with said justifier ring drum. The upper end of the external spline-carrier $V^5$ is provided with the bell-crank lever Y (Figs. 2 and 5) which, in connection with the rod $Y'$ serves to swing the justifier punch frame and its punch to any one of five positions, according to the number of justifier rings brought into operation, to make the required justified word-space perforations upon the tape or ribbon.

The push rod $V^7$ will not be operated until all the perforations in the ribbon representing the second line of print have been made, for the reason that while the line lever will act at the end of the first section of ribbon representing a printed line it will perform no function through the push rod, as the spring $V^{10}$, connecting the bell-crank lever $V^{11}$ and the arm operating the push rod will yield, this spring being weaker than the spring $V^6$ which holds the spline-carrier and push rod $V^7$ forward. At the end of the perforations representing the second line of printed matter the operator, before depressing the line lever, will operate the justifying lever U which will by means of cam $U^4$ and pawl and ratchet $U^8$ and $U^9$ withdraw the spline-carrier $V^5$ the width of one or more justifying rings and leave the push rod free for operation by the line lever.

Near the inner end of the justifier lever shaft $U^2$, and secured thereto, is a bevel-gear $U^3$ (Figs. 13, 14, 15, and 22) which meshes with bevel-pinion $u'$ on the shaft $u''$, and said shaft is provided with the single toothed ratchet wheel or clutch $u^2$, formed integral therewith, and with which the pawl $u^3$, on gear $O^3$ engages, to turn said gear until the pin $O^4$ thereon contacts with the step-cylinder retaining arm $O^5$, and through a projection $O^6$ on the same, engaging with the first step of the step-cylinder to stop said step-cylinder in its normal or "starting position." At the same time the gear $O^3$ revolves intermediate gear $O''$, and gear $O'$ secured to end of the sleeve O, on transverse shaft $L^9$, to wind the spring $n'$ of the step-cylinder N for the next operation.

If the number of units required to justify the line are equal to or less than the number of word spaces, the justifying lever U will be actuated to its full extent past the stop * in Fig. 2, and it will not again be actuated for that line, but the operator will press the line lever P, which, in addition to the operations of that lever heretofore described, will perform additional functions which I will presently describe. If the justification required for a line be a greater number of units in value than the number of word-spaces in the line, then more than one of the justifier rings must be brought into action, since each justifier ring signifies the addition of only one unit to the normal word-spaces. Each stroke of the justification lever brings into action one of the rings, so that where the justification requires the addition of two units to any of the normal word-spaces, two strokes of the justification lever are required; where three units are required for any of the word-spaces to complete the justification three strokes of the lever are required, and so on—the justification lever being moved repeatedly to bring the justifier rings successively into operation. When a greater number of units are required to justify a line than there are word-spaces in said line, so that the justifying lever will have to be actuated more than once, the operator will only draw the justifying lever as far as the stop *, until the last operation (shown in Figs. 3 and 21), as the throw of the lever from the normal position to said stop is not sufficient to give a complete rotation to the pinion $u'$ and gear $O^3$, and it is only on the completion of the rotation that the step-cylinder mechanism is released and reset.

With the return of the justifying lever to normal position, the pinion $u'$ is likewise returned, but not the gear wheel $O^3$, which is held to the position to which it has been advanced by means of the pawl $O^7$ (Fig. 15) while the tooth $u^2$ of the clutch will ride under the pawl $u^3$ on said wheel, but will not be permitted to engage again with said pawl, as the wheel has not been carried by the first movement of the lever to its normal position, and each additional movement of the justifying lever as far as the stop *, on the side of the keyboard, will not move the gear, as its pawl has not been permitted to engage again with the clutch, but when the alarm, hereinafter referred to, rings, and the operator is notified that the next operation of the lever will complete the justification of the line, the lever is drawn past said stop *, and in so doing the clutch will complete the rotation of the gear in completing its own rotation, and then on moving the justifier lever back to normal position the cam again engages with the pawl, so that upon justifying the next line the pin $O^4$ on said gear wheel will again operate to disengage the lever $O^5$ from its connection with the step-cylinder N, which is then subject to the action of the coiled spring $n'$ in the said cylinder, and the cylinder will be turned by said spring until a pawl $n''$ on the side of said cylinder contacts with a pin $m$ in the unit-pin sector M, previously set by the pin $l^2$ on bracket $l^3$, connected with the unit counting wheel $L^4$, as clearly shown in Fig. 14.

It will now be seen that the unit counting wheel has designated a pin on the unit pin-sector as many spaces from the normal as there are lacking units to complete the justification of the line, and that this pin will arrest the unit step-cylinder after as many steps have been counted off as were previously designated on the sector, and this mechanism will control the rings 1, 2, 3 and 4, as already described, and clearly shown in Fig. 22.

Each ring, as it is brought to position, will prevent the spring $V^6$, through the medium of the external spline from returning the parts to their normal position. In order to bring the several rings into action, that is to impart a rotative movement to each ring as the spline is withdrawn from each, the following mechanism is employed: The shaft $U^2$ (Fig. 22) after passing through its bearings, has loosely mounted on it an arm $v^3$, provided with a toothed sector $v^2$ on its lower end, the hub of said arm being recessed as shown in Fig. 23, and a pin $v^{12}$ on the shaft holds the said arm and sector to normal position against the action of the spring $v''$ on shaft $v^8$, which is under tension and connected with the pinion $v^9$, engaging said sector and giving it a constant tendency to operate the arm $v^3$ through the medium of the sector, whenever the shaft $U^2$ is operated. The arm $v^3$ is provided at its extreme end with a pawl $v^4$, adapted to engage the ratchet sector $v^6$, which is loosely mounted with the gear quadrant $v^7$, upon the shaft $U^2$, but the pawl $v^4$ is held from immediate engagement with the ratchet sector by means of a shield $v^5$ secured to the bed of the machine, as fully shown in Fig. 22, and permitting the spring, by withdrawing the pin from one side of the recess in said arm to turn said arm a short distance, the pawl passing off the shield and engaging a tooth of the ratchet sector so that any further movement of said arm will carry the ratchet sector with it, and thereby the gear quadrant, which meshes with the teeth of the double rack $v^{10}$, the teeth on the opposite side of the said rack $v^{10}$, meshing with the pinion $V^4$, attached to the justifier ring drum $V''$, but loosely mounted upon the shaft supporting said drum. The rack is advanced in the direction of the unit step-cylinder N until it is arrested by contact with the step on said cylinder, which has been brought into its path by the turning of the cylinder, and as clearly shown in Figs. 1 and 13. If a line requires no justification by reason of its having the maximum number of units in it, it is obvious that said rack will not be permitted to operate at all, as it would contact with the edge of the cylinder instead of one of the steps thereon, and as the rack is actuated by a spring $u$ all the parts that are operated by it would remain stationary, but if it is allowed to advance the distance of one or more steps it will operate to that extent to turn the drum $V''$ through the medium of the pinion $V^4$, the space of one or more units, and as the external spline has been withdrawn from the first ring, in the manner heretofore described, and the internal spline has engaged the said ring, it is obvious that any movement imparted to the drum through the medium of the rack, as just described, will turn the ring, which has been disengaged by the external spline and engaged by the internal spline so that it will be moved to the same extent, and that if the unit step-cylinder has been set for, say ten steps, and there are ten word spaces in the line, the rack will advance a distance to turn said ring a corresponding limit, and as the alarm will denote that no additional space has been indicated to justify the line, the operator will continue the movement of the justifying lever to its extreme limit, as hereinbefore stated. This alarm may be an electric bell indicated at 6 in Fig. 13, whose circuit is connected to the frame of the machine and to an insulated contact 9 on the rack $v^{10}$.

The additional movement of the justifying lever will operate to restore the pin in the unit-pin sector, and also to release the unit step-cylinder N in the following manner: The gear $O'$ is connected with gear $O^3$ by an idler $O''$ so that the additional movement imparted to the lever and transmitted through the gears will bring the cam $o^2$ (see Figs. 13 and 15) against a pin $o^3$ located in a loose arm $o^4$ pivoted on the frame $i$ and arranged between the gear $O'$ and the end of the pin-restoring arm $o$, so that when the pin is struck by the cam in said groove it will operate to give the arm $o$ and its sleeve an end thrust upon the shaft $L^9$, contracting the spring $o''$ and thereby causing the pin $o'$ in the end of the arm $o$ to restore the pin $m$ in the unit-pin sector M, so as to release the step-cylinder and allow the coiled spring $n'$ to return it to normal position. The cam face $o^5$ on the end of the arm $o$ in this endwise movement thereof engages with a cam face $n^3$ on pawl $n''$, throws the pawl $n^3$ (see Fig. 16) out of the line of travel indicated by the pins in the unit-pin sector, so that said pawl will not make contact with any of said pins on the completion of the rotation of the step-cylinder N. On this further rotation of the step-cylinder to normal position the pawl is again set in the path of the unit sector pins by a fixed pin or lug $n^4$, engaging the tail $n^5$ of pawl $n''$ so that whatever pin in said sector is thrown into operation, it will arrest the step-cylinder when again returned to operative position through the instrumentality of said pawl.

The justifier ring 1, (Fig. 10) has a pin $t^2$ projecting from its opposite side upon an offset, or groove $t$, in the next adjacent ring, so that should two rings be required, in order to justify the line, the second ring will be arrested by the pin $t^2$ upon the first ring, and should the third or fourth ring be required they will be arrested in like manner by the second or third ring if they are all used, provided, however, that the units required to justify the line divide evenly into the word spaces, otherwise the last of the series of rings set, whether the second, third, or fourth, would be arrested by the end of the rack $v^{10}$ contacting with a step of the unit step-cylinder N. In this manner, if there were nine word spaces in a line and it required twelve units to justify the line, the first ring would be moved far enough from the normal position to carry the set pin back nine points, and the ring 1 would be permitted to move, through the instrumentality already described, until its pawl comes in contact with the pin set by the lever $s'$ on operation of the line lever, when another operation of the justifying lever would in like manner cause ring 2, to move the space represented by three word spaces, when the rack bar $v^{10}$ would be arrested by the step-cylinder, as already described, and thus prevent the further movement of said ring.

We will now suppose the first two rings to be set, in the manner just described, to indicate the justification of a line containing nine word spaces and requiring twelve units to be added to said spaces in order to justify. By an examination of Fig. 6, it will be observed that after the paper has passed through the die-block F, for making the character perforations, it falls into a loop and is then carried up into the die-block $x'$ for making the word-space perforations.

It is contemplated, for the purpose of this specification, that the section of paper from die-block F, and over the feed roller F', forming the loop up to the die-block $x'$, for perforating the word-spaces, will contain a sufficient number of perforations to represent two lines of print, and the mechanism herein described discloses a machine capable of being operated to make perforations in the ribbon representing justified word-spaces upon the section of ribbon representing the line of print first indicated, by perforations in said ribbon, while the operator is making perforations representing the characters and certain functions to be performed by the machine for the third line of print, while the perforations representing the second line of print will be upon that portion of the ribbon shown as forming the loop. It is in carrying out this method of making the word spaces automatically, and after one or more sections of ribbon have been perforated to represent the characters, that the slide-cylinder H and counting-pin cylinder J, have been incorporated into the mechanism, and the manner in which they cause the punch $x$ and its die $x'$ to make the perforations representing word spaces in this manner, will now be described:

Having counted the number of word spaces through the word-space pin drum V and set the rings 1 and 2 so as to add two units to each of three word spaces and one unit to each of six word spaces, making the nine word spaces and twelve units, as referred to, the operator will depress the line lever P as already described, and through the rod J'', bell-crank $J^2$, and escapement $J^3$ cause a second release of the counting-pin cylinder J, also operating the transfer beam $K^6$ in the manner previously described, for setting the slides in the slide-cylinder, representing the section of perforations supposed to be made in that part of the ribbon forming the loop. This operation will transfer to the pin cylinder J the pins representing the word spaces denoted on the section of paper referred to, and at the same time release the pin cylinder a second time, the operation of the said cylinder then being as follows: The pins projected to a long setting will again operate the finger Q and rod Q', in the manner heretofore described, for counting off the word spaces on the word-space pin drum V, while pins previously set, and on the other half of the cylinder, which had performed the same function on the previous half rotation of the same cylinder, will make contact with a similar finger W, (Figs. 2 and 3) at the top of said cylinder, in passing, and after operating said finger will be returned to their normal position ready to be again projected upon another movement of the transfer beam representing a third line, at the same time the finger will give the shaft W' a rotary movement, and through the medium of arm W'', attached to said shaft W', will operate the rod $W^2$, which connects at its opposite end to an escapement, made of the conventional form herein shown, to release an escapement wheel $W^3$ upon the shaft $W^4$; said wheel receiving power from the master pulley A', by means of a belt and a friction pulley $W^6$ upon said shaft (see Fig. 8). The shaft is also provided with a pinion $W^7$, rigidly attached thereto, which gears with a returning gear wheel $V^3$. This wheel is normally free to rotate on the drum V'', but upon the depression of the line lever it is locked to said drum in the following manner: The arm $V^8$, shown near the left in Fig. 1, engages the push rod $V^7$, that extends into the bore of the fixed shaft $V^2$, in the manner shown in Fig. 8. The fixed shaft is slotted, and the rod $V^7$ is attached to a flanged collar T, by means of a pin or key. The flange of the collar, as clearly shown in Figs. 8 and 22, connects with the notch in the shank of the spline T', and said spline is cut away so as to allow of the free rotation of the gear wheel $V^3$ upon the drum V'', as stated, but upon being actuated by the flange T on the collar the raised portion of said spline will be drawn so as to connect the gear $V^3$ with the drum V'', while the opposite end of said spline will connect the ring 1, also with said drum V''. Having thus connected the gear wheel $V^3$, and the ring 1, with the drum, by means of the spline T', and as ring 1 is already connected with said drum V'', by means of said spline T', it will be seen that the drum, and the said rings connected with the said drum by said spline, will all be rotated in the reverse direction to that heretofore imparted to them through the medium of the justifying lever and rack and pinion connections. As the shaft $W^4$ is rotated for the purpose of restoring the parts above mentioned to their normal position, it operates a cam X, secured to the end of said shaft, as shown in Fig. 8 in dotted lines, but more clearly illustrated to the right in Fig. 5. This cam X, may be described as a five-lobed face cam, which is adapted to engage the cam-roller X' upon the upper end of a piston $X^*$ arranged in the vertical air-cylinder X''; said cylinder having a compressed air supply $X^8$ and provided with communicating tubes $X^2$ and $X^3$ between it and a similar air-cylinder $X^4$ arranged upon a projection on the word-space punch carrier $X^5$; said cylinder $X^4$ being provided with a piston $X^9$, connecting by a pitman with the lower end of the bell-crank lever $X^6$ which operates the word space punch $x$ through the toggle lever $X^7$, more clearly illustrated in Fig. 6. The opposite end of the lever $X^5$ contains a slot into which the edge of the perforated ribbon extends, and above this slot in said lever is located the die $x'$, which coöperates with the punch $x$ for making the perforations to represent the word-spaces. It will thus be seen that as the shaft $W^4$, (see Fig. 8) returns the parts to normal position, it will, at the same time, through the medium described, cause the perforations to be made, and as the number of perforations to be made is first indicated upon the word-space pin drum V, (see Figs. 2, 14 and 22), the number of perforations made will correspond exactly with the number of word spaces indicated by pins projected to a "long setting."

In order to locate the punch $x$ and its die $x'$, transversely of the ribbon, so as to make perforations upon different longitudinal lines, and thereby represent different widths of word spaces, the lever $X^5$ is connected by rod $Y'$ to the bell-crank Y, (see Fig. 5), the opposite arm of which is loosely pivoted to the arm $V^5$, which constitutes the spline-carrier and is controlled as to its position by the set justifier reams as above set forth.

As the external spline $T^5$ has been held back against the tension of the spring $V^6$, (shown in Fig. 22) by means of its end abutting against the sides of those justifier rings which have had their slots $T^7$ advanced so as to be out of line with this spline so that the spline could not enter them, it is obvious if these shifted rings be given a reverse movement, that when they are in position so that their slots $T^7$ will again come into line with said spline, the spline will enter the slots in said rings and prevent their further rotation, and that the movement of the parts upon the spline entering a slot in the ring will cause the internal spline to disconnect said ring from the drum V, which has formed the connection between the drum and ring, in order that it might be rotated, and if in the case supposed, of nine word spaces and twelve units to be added, one of said rings has been actuated to an extent that it will add nine units, or one to each word space, and the other ring has only been actuated sufficiently to add one more unit to three of the nine, the notches in said rings upon their return movement will not register at the same time with the external spline; but upon the return movement in making three word spaces, the ring 2 will register with the said spline, and the spline entering the notch therein will disconnect it from the drum and lock it against further rotation, and, through the mechanism just described, will withdraw the die-block $x'$ and punch $x$, one longitudinal line nearer the margin of the perforated ribbon. The further return movement then only operates the ring 1 until its slot $T^7$ comes in line with the external spline, whereupon this spline enters the slot, thereby, through the connections described, bringing punch and die $x$—$x'$ one longitudinal line nearer the edge of the paper to punch the remaining six perforations to locate them on a second longitudinal line. The printing mechanism to be controlled by the perforated ribbon may be constructed and arranged to recognize or be controlled by, in the example just given, the first three perforations to vary the word spaces by a given number of units and to recognize or be controlled by the remainder of said perforations to vary the word spaces by a different number of units. Thus, the first three perforations might be recognized to vary the word spaces two units and the remaining perforations to vary said word spaces one unit in addition. As these justifying perforations are made in the strip it has to be fed forward from time to time so as to cause each of such perforations to occupy the proper position in the length of the strip, relatively to the character perforations. This is effected by the following mechanism: Above the slide-cylinder H, and on a line therewith, is a small shaft Z, (Fig. 19) the one end of which has its bearings in the frame of the paper-fed rollers, and on the opposite end in a vertical arm of the frame and upon such end of the shaft, directly in the path of all the pins in the counting-pin cylinder J, set either to a "short setting" or to a "long setting", is provided a pawl $Z''$, having a suitable tension spring $Z^2$. The opposite end of said shaft Z, adjacent to the frame of the paper-feed rollers, is provided with a spring-actuated pawl $Z^3$, the end of which contacts with the spur-wheel $Z^4$ on the end of the feed roller $F^3$ to make one transverse feed of the ribbon as the pawl $Z''$ is successively operated by the passage beneath it of all the pins set in counting-pin cylinder, as aforesaid.

The invention in its broader aspects is not limited to the embodiment illustrated and described, but many changes may be made therein, within the scope of the appended claims, without departing from the principles of the invention and without sacrificing its chief advantages.

Having thus described my invention, the following is what I claim as new therein, and desire to secure by Letters Patent:—

1. In a machine for making composing ribbons, a set of keys and means operated thereby for making a plurality of different character-representing perforations along a single transverse line of the ribbon.

2. In a composing-strip perforating machine, the combination of a set of keys, a perforating device, means to move said perforating device transversely across the strip, and means selectively controlled by the keys to arrest said transverse movement of the perforating device at various points in its path.

3. In a machine for making composing ribbons, a set of keys and means operated thereby to make shift perforations in the ribbon whereby said ribbon is adapted to select characters from different cases or faces of type.

4. In a composing-strip perforating machine, a key-board, a shift key in said key-board, connections between said shift key and the perforating device whereby the perforating device is actuated by said shift-key.

5. In a composing-strip perforating machine, the combination of a perforating device and strip-feeding means, means actuated by the key levers to move the perforating device transversely across the strip, and means interposed in the path of the perforating device to arrest its movement at points which correspond to the characters to be represented on the strip.

6. In a composing-strip perforating machine, the combination of a key-board, a strip-feeding means and a perforating device, means to reciprocate the perforating device transversely of the strip, a series of stops corresponding to keys of the key-board and actuated by said keys to arrest the perforating device at points which correspond to the characters to be represented on the strip.

7. In a composing strip perforating machine, a key-board, individual keys of which represent a plurality of characters, a shift device controlling the action of the character keys and determining by its action which of their characters the individual keys shall indicate on the strip, and connections between said shift-key and the perforating device whereby the perforating device is actuated by said shift-key.

8. In a machine for making composing ribbons, a set of keys representing typographic characters and functions, means controlled and operated by said keys for making perforations in the ribbon to represent the characters or typographic functions of the operated keys, the perforation corresponding to a given key being made by the operation of the next operated key.

9. In a machine for making composing ribbons, a set of character keys, means controlled thereby to perforate the ribbon, each of said keys representing a plurality of characters, other keys and means controlled thereby to perforate the ribbon with perforations designating the particular character to be represented by the character-key perforation.

10. In a machine for making composing ribbons, means for perforating the ribbon with a plurality of character-representing perforations between feed movements of the ribbon and means for perforating the ribbon with perforations representing justification, the justification perforating means operating on the ribbon one or more transverse sections of the ribbon behind the character perforating means, whereby the character perforations for one line of print are made while the justification perforations for a previously perforated line of print are being made.

11. In a machine for making composing ribbons, mechanism to feed the ribbon through the machine, means to perforate said ribbon with character-representing perforations along transverse lines thereof between its feed movements, means to actuate the ribbon feed-mechanism automatically when characters in the composition occur out of a predetermined order of sequence, means to perforate said ribbon to represent lines of composition, means to perforate said ribbon to represent the word spaces in a given line of composition, and means to perforate the ribbon with justification representations for a preceding line of composition when the character-representations for a subsequent line are being perforated.

12. In a machine for making composing ribbons, means for making a plurality of character-representing perforations along single transverse lines of the ribbon, feed mechanism for feeding the ribbon through the character-perforating means, means for making word space and justification perforations in the ribbon and independent feed mechanism for feeding the ribbon through the word space and justification perforating mechanism.

13. In a machine for making composing ribbons, means for feeding the ribbon through the machine, means for making a plurality of character-representing perforations between feed movements of the ribbon, means to determine the unit value of the characters and normal word spaces in a line of composition and automatic means to perforate the ribbon to represent the justification required to be added to the line.

14. In a machine for making composing ribbons, a punch carrier provided with a character punch and a punch locating pin, an air cylinder and a piston to operate said carrier, means for operating the punch and the punch locating pin, a series of pins adapted to be projected in the path of the carrier to control its movement, a key-board and connections between the keys thereof and the pins whereby depression of the keys actuates the pins.

15. In a machine for making composing ribbons, a key-board, a line lever or key, a justification lever or key, a punch for perforating the ribbon, a carrier for the punch and means to operate the carrier, a punch locating device on the carrier and means for operating the punch and locating device, mechanism for feeding the ribbon, connections between the line lever and punch whereby line perforations are made in the ribbon representing line divisions of the composed matter, means for automatically determining the total unit value of the characters and normal word spaces in a line division, and means controlled by the justification lever to perforate the ribbon with perforations representing the units of justification necessary to justify the lines.

16. In a machine for making composing ribbons, means for feeding the ribbon intermittently through the machine, key-operated mechanism for making one or more character perforations in the ribbon between consecutive feed movements thereof, means for counting the ribbon feed movements, means for counting the word spaces in the composition, an independent ribbon feeding mechanism, and connections to actuate the same from the counting mechanism for the feed movements, a stop mechanism, automatic means for setting said stop mechanism in accordance with the justification required for each line of composition, means controlled by said stop mechanism and the word space counting mechanism to apportion the justification required among the word spaces counted and means to perforate the ribbon to represent the justified word spaces.

17. In a machine for making composing ribbons, two separate and independently controlled feed mechanisms acting on different parts of the ribbon, a traveling punch-carrier for perforating the ribbon with character perforations, means operated by the punch carried to control one of the ribbon feed mechanisms, means set by the punch-carrier to count the feed movements so made, and connections from said counting means to operate the other ribbon feeding mechanism.

18. In a machine for making composing ribbons, a traveling punch-carrier, a series of stop pins adjacent the path of the carrier, a set of keys corresponding to the stop pins, key-operated means for projecting the corresponding stop pins into the path of the carrier to control its movement, one of said keys and stop pins representing a normal word space, a ribbon-feed escapement mechanism, an arm connected therewith extending into the path of the punch-carrier and having connection with the word space stop pin, a slide carrier, setting means for the slides of said carrier connected to said arm, and means on the arm to cause a setting of the slides to one setting when the word space stop pin is operated and to a different setting when the said stop pin is not operated, a justification mechanism including a punch and a ribbon feed mechanism, and means controlled by the different slide settings to govern the movements of said punch and ribbon feed movements respectively.

19. In a machine for perforating composing ribbons, a set of keys, a punch carrier, means to give a reciprocating movement to the punch carrier, a double row of stop pins along the path of the carrier, connections between the stop pins and the keys such that operation of a key projects a corresponding stop pin into the path of the carrier to arrest it, each stop pin formed with two members one of which has a beveled face and the other of which constitutes a restoring member, the beveled faces of one row of stop pins presented in one direction to the movement of the carrier and the beveled faces of the other row of stop pins presented in the opposite direction, a pair of spring pawls on the punch carrier one of which engages projected stop pins in one row and the other of which engages pins in the other row of stop pins, and a pin restorer on the carrier operatively connected with the punch and arranged to engage the restoring members of both rows of stop pins as and for the purposes described.

20. In a machine for making composing ribbons, a single set of character keys representing a plurality of sets or faces of type, a unit counting mechanism having operative connection with the character keys, means connected with individual keys to govern the unit counting mechanism in accordance with the unit values of the characters in the several sets or faces of type, and shift means to select and position the governing means to govern the unit counting mechanism in accordance with the selected set or face of type.

21. In a machine for making composing ribbons, a set of character keys individual keys of which represent a plurality of characters, a plurality of vanes connected to individual keys, the vanes of a given key corresponding to and representing respectively the unit values of the several characters represented by that key, and a shift mechanism arranged to operate the vanes and move them into operative position to designate the particular character to be represented by a key.

22. In a machine for making composing ribbons, a single set of character keys representing a plurality of sets or faces of type, a unit counting mechanism having operative connection with the character keys, means connected with individual keys to govern the unit counting mechanism in accordance with the unit values of the characters in the several sets or faces of type, a set of shift keys designating the several faces or sets of type, perforating means operated by the character and shift keys and shift means to select and position the governing means to govern the unit counting mechanism in accordance with the selected set of face of type.

23. In a machine for making composing ribbons, a set of operating keys comprising "line" and "justification" levers, mechanism for counting and storing the unit values of the characters and normal word spaces in a line of composed matter, means for indicating the number of units required for the justification of a line, a stop mechanism and means for positioning the same in accordance with the justification indicated, means for indicating the number of normal word spaces in a line, and means controlled by the "line" and "justification" levers and by the stop mechanism for apportioning the justification required among the normal word spaces.

24. In a machine for perforating composing ribbons for typographic purposes, a traveling punch, a punch-locating pin coöperating with said punch, and means for arresting the travel of the punch at a die for locating the character or word space to be subsequently perforated in the ribbon.

25. In a machine for perforating composing ribbons, means for making a plurality of perforations along a single transverse line of the ribbon, said perforations representing a plurality of letters, characters or functions which occur in a predetermined order of sequence in the matter to be composed.

26. In a machine for making composing ribbons, a traveling punch, a die-plate adjacent the path of the punch and provided with a plurality of dies, key-controlled mechanism to arrest the punch in its travel and actuate the punch in arrested position, and coöperating means on the die-plate and punch to insure exact registry of the punch with the dies.

27. In a machine for perforating composing ribbons, the combination of a keyboard and connecting mechanism with a die-plate having a plurality of openings, a traveling punch coöperating with said openings, and means for locating the punch to register therewith and means to operate the punch to make the perforations.

28. In a machine for perforating composing ribbons, key means for bringing the punch to position to make a perforation representing the letter, character or function indicated by the key depressed, and means for making said perforations upon the second depression of the same key and again bringing the punch to position.

29. In a machine for perforating composing ribbons, means for positioning the punch to make a perforation representing a letter, character or function, and means for positioning the punch to make a perforation representing a different letter, character or function upon making the perforation for which the punch was precedently positioned.

30. In a machine for perforating composing ribbons, means for bringing the punch into operative position to make a perforation representing a given letter, character or function and means to release the punch from such position by the act of making the perforation.

31. In a machine for perforating composing ribbons, a stationary die-plate representing a plurality of dies, in combination with an intermittently traveling punch and mechanism adapted to locate the punch so it will register with any of said dies.

32. In a machine for perforating composing ribbons, a traveling punch-carrier, a punch located therein, a stationary die-plate, means for selecting the die therein, means for arresting the carrier at the selected die, and means for operating the punch to perforate the ribbon and to release the carrier substantially as set forth.

33. In a machine for perforating composing ribbons, a reciprocating punch carrier, means for applying a yielding pressure thereto and means for reversing the travel of the carrier while traveling in either direction, a plurality of dies and means for causing the punch to register with one of the plurality of dies, substantially as set forth.

34. In a machine for perforating composing ribbons, a series of finger keys, a series of movable pins controlled by the action of said keys, and a traveling punch carrier, the movement of which is controlled by the pins.

35. In a machine for perforating composing ribbons, a traveling punch carrier, a series of finger keys, an air supply, and a series of valves controlled by said keys whereby the air is rendered operative to control the movement of the punch carrier.

36. In a machine for perforating composing ribbons, key-board mechanism, and mechanism for making only the perforations representing the letters and characters employed, and mechanism controlled mechanically from the key-board to operate a separate punch for the word space, justifying mechanism comprising unit storing devices, perforating devices, and connections controlled by said unit storing devices for selectively operating the perforating devices.

37. In a machine for making composing ribbons, a punch device and means to cause the same to travel transversely of the ribbon, and automatically controlled mechanism for causing said punch device to make perforations in the same transverse line on the ribbon representing all the characters occurring successively in the composition which follow a predetermined order of sequence.

38. In a machine for perforating composing ribbons, a set of keys representing printing characters and functions, perforating-mechanism operatively connected with the keys to perforate the ribbon in accordance with the operation of the keys, automatic means to count the word spaces in a line of composition, an automatically operated punch for perforating the ribbon to represent justified word spaces and mechanism for positioning said punch according to the amount of justification required for a given word space.

39. In a machine for perforating composing ribbons, a cylinder containing a plurality of sliding bars, each bar adapted to be moved in said cylinder to two positions, one position representing only a transverse line of perforations upon the ribbon and the other position representing both a transverse line of perforations and also a word space.

40. In a machine for perforating composing ribbons, a slide cylinder carrying a plurality of slides, automatically operated means to set the slides to two different settings, one setting representing a transverse line of perforations on the ribbon and the other setting representing a transverse line of perforations and also a word space, a pin cylinder carrying a plurality of pins, means to transfer the different slide settings to the pins in the pin cylinder, a ribbon feed mechanism and a justified word space punch controlled by the pin settings in said slide cylinder.

41. In a machine for making composing ribbons, a slide cylinder carrying a plurality of slides, means for setting said slides to different settings which represent respectively the number of transverse lines of perforations in the ribbon occupied by a line of the printed composition, and the number of word spaces occurring in said line of print and also transverse lines of perforations, a pin cylinder carrying a plurality of pins, manually operated means to indicate line divisions on the ribbon, and means operated by said line-indicating means to transfer the respective slide settings to the pins of the pin cylinder.

42. In a machine for making composing ribbons, key-operated means for making perforations in the ribbon which represent the characters and normal word spaces in a line of the printed composition, means for counting the word spaces when made, a punch for perforating the ribbon to represent the justification required for a line of the printed composition, and means for controlling and operating said punch for one line of the printed composition while the perforations for the characters and normal word spaces are being made for a subsequent line of the composition.

43. In a machine for making composing ribbons, a unit counting mechanism, a word space indicating mechanism, means for indicating the amount of justification required for a line of the printed composition, a series of stops and means to set the same in accordance with the amount of justification indicated, a series of justifier rings, means to position said rings, said positioning means controlled by the word-space indicating mechanism and the series of stops, and a justified word space punch controlled by the position of said rings.

44. In a machine for making composing ribbons, a unit counting mechanism, a word space indicating mechanism, means for indicating the amount of justification required for a line of the printed composition, a series of stops and means to set the same in accordance with the amount of justification indicated, a series of justifier rings, each ring representing one unit of justification for each word space indicated, means to position said rings in accordance with the number of word spaces indicated, and a justified word space punch controlled by the position of said rings.

45. In a machine of the character described, a keyboard, a justifying mechanism, means for automatically designating the amount of justification required, a series of devices for making character representations controlled by the keys of the keyboard, a device for making word space representations in a predetermined relation to the series of character representations for the successive words, a device for making justification representations, a justification mechanism comprising means for automatically designating the amount of justification required for each line of the composition, connections between the said designating means and the device for making the justification representations, and means for making the justification representations in definite relation to the word space representations.

46. In a machine of the character described, means to designate automatically the amount of justification required for a line of composition, a punch device for making justification representations in a controller, means to position said punch device, said positioning means controlled by the means for designating the amount of justification and means to operate the punch.

47. In a machine of the character described, means to count or record the normal word spaces in a line of composition, means to designate automatically the amount of justification required for said line, a punch device for making justification representations in a controller, said punch positioned by the count or record of the word spaces and the means for designating the amount of justification.

48. In a machine of the character described, key-controlled means for making character and word space representations in a tape or ribbon, means to record the number of word spaces in a line of composition, means for making representations in the ribbon to signify the unit values required for the several word spaces to make the lines of composition of predetermined length, and means to designate automatically the unit value of the word spaces, the means for representing the unit values of the word spaces governed and controlled by said word space record and unit value designating means.

49. In a machine of the character described, key controlled means for making character and word space representations in a controller tape or ribbon, means for recording the number of word spaces in a line of composition, means for automatically designating the total amount of justification required for said line of the composition, means controlled by the word space recording means and the justification-designating means to apportion the total amount of justification designated for said line among the several word spaces therein, and means for automatically marking on the tape or ribbon adjacent each word space representation a representation signifying the amount of the justification apportioned thereto.

50. A machine for making composing ribbons including in combination perforating mechanism, a plurality of character keys, a plurality of vanes each representing or corresponding to the unit value of particular character representations, unit recording mechanism, a shift mechanism adapted to coöperate with said character keys, and means for positioning the said vanes so that the proper unit value will be assigned or recorded for the character representation.

51. A machine for perforating composing ribbons including in combination a keyboard mechanism, a series of devices for making character perforations, said devices being controlled by the keyboard, an automatic justifier, devices for making justifying perforations, said devices being controlled by the keyboard, and automatic means for controlling the feed of the ribbon so that the justifying perforations may be in proper relation to the character perforations.

52. In a machine auxiliary to a typographic machine, a series of keys, means for making letter representations recognizable by the typographic machine, means for designating a letter representation upon the depression of a key, and means for making the letter representation previously designated.

53. In a machine auxiliary to a typographic machine, a series of finger keys, two parallel rows of stops, the stops in staggered relation to each other, and mechanism between the keys and stops to actuate the stops upon the depression of a key.

54. In a machine auxiliary to a typographic machine, a series of finger keys, two rows of stops, mechanism between the stops and keys to transmit the movement of the keys to the stops, and means for retaining the stops in operative position after the keys have been released.

55. The combination with a series of stop pins, and keys for actuating the same, of a punch carrier traversing said series of pins and provided with means for engaging the actuated stop pins to arrest the carrier, and with means for returning the actuated stop pins to normal position.

56. In a machine of the class described, the combination with two series of stop pins, and keys for actuating the same, of a carrier traversing both said series of pins, and provided with latches adapted to engage the actuated pins of one row in one direction of its travel and the actuated pins of the other row in the other direction of its travel.

57. In a machine of the class described, the combination with two series of stop pins, and keys for actuating the same, of a carrier traversing both said series of pins, and provided with means adapted to engage the actuated pins of one row in one direction of its travel and the actuated pins of the other row in the other direction of its travel.

58. In a machine of the class described, a reciprocating punch carrier, two rows of pins adjacent the path of said carrier, means to project said pins into the path of the carrier to arrest the same, means on the carrier to engage projected stop pins in one row and to pass over projected stop pins in the other row when said carrier is moving in either direction.

59. In a machine of the class described, a reciprocating punch carrier, two rows of pins adjacent the path of said carrier, means to project said pins into the path of the carrier to arrest the same, means on the carrier to engage projected stop pins in one row and to pass over projected stop pins in the other row when said carrier is moving in either direction, and means on said carrier to return the stop pins in succession after being arrested thereby.

60. In a machine of the character described, means to mark a composing strip with representations of a plurality of typographic characters in a single transverse line of the strip, the representation for the same character always occupying relatively the same position on the strip, and automatic means to give repeated characters separate representations on the strip.

61. A machine for making a controller for a typographic machine including in combination a traveling punch carrier, means for designating various points in the travel of the carrier at which it is to be brought to rest, means for driving the carrier from one point of rest to the next, means operating upon the designation of a second point of rest to actuate the punch while the carrier is at said first point of rest.

62. A machine for making a controller for a typographic machine, including in combination a carrier having a punch, means co-operating therewith to punch the controller, fluid pressure mechanism for driving said carrier, and means operated by said carrier for controlling said fluid pressure.

63. A machine for making a controller for a typographic machine including in combination a carrier having a punch, means co-operating therewith to punch the controller, fluid pressure mechanism for driving said carrier, and means operated by said carrier for controlling said fluid pressure to change the direction of travel of said carrier.

64. A controller for a typographic machine including in combination means for making representations of typographic characters in the controller, a series of devices corresponding to the characters so represented for determining the space unit value of each character, devices for storing the unit values for a line, justifying devices for marking the justification of the controller, and means for automatically controlling the justification devices in accordance with such stored unit values to automatically justify the line.

65. In a machine of the character described, the combination with a series of stop pins, and means for actuating the same, of a punch carrier traversing said series of pins and provided with means for engaging the same to arrest the carrier, of a punch operating device, and means operated thereby to restore the stop pins to normal position.

66. A machine for making a controller strip for an automatic typographic apparatus in which apparatus the types move to impression position in a definite order of sequence, including in combination means for feeding the controller strip, and means for marking said controller strip in accordance with the sequence of the type in the typographic apparatus.

67. In a machine of the character described, the combination with a series of stop pins, of a punch carrier traversing the same, means to move the carrier by fluid pressure, and means controlled by the reciprocation of the carrier to reverse the pressure at each end of the stroke.

68. In a machine auxiliary to a typographic machine, means for making in a composing ribbon perforations representing characters employed in the composition, means for representing a shift or change of type face on said ribbon without changing the character representations, so that the same character representation may represent a plurality of characters or functions.

69. In a machine of the character described, means to count and means to store the units of the characters and normal spaces comprised in a line of typographic matter, a justification mechanism to represent the justification spaces required to justify a line, manually operated setting means for said justification mechanism, the manual operation of which is uniform for all conditions of justification.

70. A machine for perforating composing ribbons including in combination a keyboard mechanism, devices for making character perforations controlled by said keyboard, means for storing the unit values of the character perforations, connections between said perforating devices and said storing devices for causing the storing devices to store the unit values of successively selected characters, an automatic justifier, constructed and arranged to be set by said unit storing means, and devices controlled by said justifier for perforating the justifying perforations.

71. A machine for making controllers for a typographic machine including in combination a series of keys, perforating devices, and means for operating a perforating device upon the depression of a subsequent key after the key corresponding to the perforating device.

72. A machine for making controllers for a typographic machine including in combination a series of keys, perforating devices, a keyboard, and means for operating a perforating device upon the depression of the next subsequent key after the key corresponding to the perforating device.

73. A typographic machine including in combination means for making typographic representations in a controller and means operating automatically to make justifying representations in a controller, whereby the typographic representations are disposed in justified lines.

74. In a machine for making a controller strip for an automatic typographic apparatus in which the types move to impression position in a definite order of sequence, means in the strip-marking machine for causing said machine automatically to mark the strip in accordance with the sequence of the type in the typographic apparatus.

75. A machine for making controller-strips for automatic typographic apparatus including in combination a series of keys which signify typographic characters and spaces, a unit-storing device, actuating means for said unit-storing device, and connections from said keys to said actuating means for determining the amount of movement received by the unit-storing device from the operation of a particular key.

76. A machine for producing a controller for automatic typographic machines comprising in combination a keyboard, the keys thereof representing a plurality of characters, means for supporting and feeding a controller, means for producing in the controller indications for various selected characters, means for collecting and storing the unit values of the selected characters, a justifying mechanism, automatic means for setting the justifying mechanism from the unit record, and means for operating the said producing means from the keyboard, means for producing justification indications, and means for presenting the controller to receive said indications at the proper places therein.

77. In a machine for making a composing strip for automatic typographic apparatus, key actuated means including stationary punches to mark the composing strip with one or more typographic representations along single transverse lines thereof, means to feed the strip progressively forward for each new line of marks, and automatic means to insure the strip being fed forward for a new line of representations between repeated operations of the same key.

78. In a machine for making a composing strip for a typographic apparatus, stationary perforating devices, a traveling carriage, strip-feeding means actuated by the carriage at the end of its travel, a series of key operated stop pins along the path of the carriage and adapted to be projected into said path to arrest the carriage, means on the carriage to disengage the stop pin therefrom while retaining the carriage substantially in its arrested position, and means actuated on a repeated projection of the same stop pin to cause the carriage to actuate the strip-feeding means.

79. A machine for making controllers for a typographic machine including in combination a series of keys, a series of stops, traveling controller marking means adapted to be arrested by said stop, and means for retaining a stop in position after its key is released.

80. A machine for making controllers for a typographic machine including in combination a series of keys, a series of stops, traveling controller marking means adapted to be arrested by said stops, and means for retaining a stop in position after its key is released, and for withdrawing said stop when a subsequent key is actuated.

81. A machine for making a typographic controller strip for use with a typographic machine in which the characters move to impression in a definite order of sequence, a keyboard, strip marking means for making a controller and including devices for automatically marking said strip in accordance with the sequence of the type in the typographic machine, and connections from said keyboard for selecting and controlling said strip marking devices.

82. A machine for making controllers for a typographic machine including in combination a series of finger keys, a plurality of rows of stops, a controller perforating device traveling along said stops and being positioned by one row of stops when traveling in one direction and by another row of stops when traveling in the opposite direction.

83. A machine for making controllers for a typographic machine including in combination a series of finger keys, a plurality of rows of stops actuated by said keys, a traveling controller marker adapted to be positioned by said stops while traveling in both directions, and means for retaining a stop in operative position after its key has been released.

84. A machine for making controllers for a typographic machine including in combination a series of stop pins, keys for actuating same, a punch carrier traversing said series of stops and adapted to be stopped while traveling in either direction, and means for withdrawing an actuated stop.

85. A machine for producing controllers for a typographic machine including in combination a series of keys, two series of stops, means traveling along said stops for marking character representations in the controller, and mechanism between said keys and stops for causing one series of stops to position said traveling means when traveling in one direction and for causing the other series of stops to position said traveling means when traveling in the opposite direction.

GEORGE R. CORNWALL.

Witnesses:
CECIL H. MOORE,
ARTHUR P. KNIGHT.